United States Patent
Huang et al.

(10) Patent No.: US 9,792,161 B2
(45) Date of Patent: Oct. 17, 2017

(54) MAXIMIZING CONCURRENCY BUG DETECTION IN MULTITHREADED SOFTWARE PROGRAMS

(71) Applicant: The Board of Trustees of the University of Illinois, Urbana, IL (US)

(72) Inventors: Jeff Huang, College Station, TX (US); Grigore Rosu, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 252 days.

(21) Appl. No.: 14/553,056

(22) Filed: Nov. 25, 2014

(65) Prior Publication Data
US 2016/0147640 A1    May 26, 2016

(51) Int. Cl.
- *G06F 9/44* (2006.01)
- *G06F 9/52* (2006.01)
- *G06F 11/36* (2006.01)
- *G06F 11/00* (2006.01)

(52) U.S. Cl.
CPC ............ *G06F 9/524* (2013.01); *G06F 11/008* (2013.01); *G06F 11/366* (2013.01)

(58) Field of Classification Search
CPC ....... G06F 9/524; G06F 11/366; G06F 11/008
USPC ........................................................ 717/130
See application file for complete search history.

(56) References Cited

U.S. PATENT DOCUMENTS

| | | | | |
|---|---|---|---|---|
| 8,904,321 B1* | 12/2014 | Cohen | ................. | G06F 17/5009 716/106 |
| 2003/0167358 A1* | 9/2003 | Marvin | .................... | G06F 9/465 719/328 |
| 2006/0031811 A1* | 2/2006 | Ernst | ................. | G06F 17/30607 717/100 |
| 2008/0313613 A1* | 12/2008 | Bierhoff | ................ | G06F 9/4428 717/116 |
| 2009/0172284 A1* | 7/2009 | Offen | .................... | G06F 12/084 711/125 |

(Continued)

OTHER PUBLICATIONS

Serbanuta et al. "Maximal Causal Models for Sequentially Consistent Systems", Springer-Verlag Berlin Heidelberg, S. Qadeer and S. Tasiran (Eds.): RV 2012, LNCS 7687, pp. 136-150, 2013.*

(Continued)

*Primary Examiner* — Li B Zhen
*Assistant Examiner* — Sen Chen
(74) *Attorney, Agent, or Firm* — Lowenstein Sandler LLP

(57) ABSTRACT

Disclosed systems and methods incorporate a sound and maximal causal model with control flow information for maximum concurrency error detection in general multi-threaded programs. The maximal causal model may be based on or integrated with the sequential consistency model, and form the basis for a formula including branch and order variables as first-order logical constraints solvable by an SMT solver for detection or prediction of concurrency errors. The disclosed systems and methods also relate to predictive trace analysis (PTA) for predicting generic concurrency properties using local traces (as opposed to a global trace) through the threads of a multithreaded program. By uniformly modeling violations of concurrency properties and the thread causality as constraints over events, and using an SMT solver, the systems and methods predict property violations allowed by the causal model.

21 Claims, 14 Drawing Sheets

(56) References Cited

U.S. PATENT DOCUMENTS

| | | | | |
|---|---|---|---|---|
| 2011/0167412 A1* | 7/2011 | Kahlon | ............... | G06F 11/3624 717/128 |
| 2014/0047282 A1* | 2/2014 | Deb | .................... | G06F 11/0751 714/48 |
| 2015/0026687 A1* | 1/2015 | Yim | ........................ | G06F 9/522 718/102 |
| 2015/0180653 A1* | 6/2015 | Nix | .................... | H04W 52/0235 380/259 |
| 2016/0011959 A1* | 1/2016 | Li | ....................... | G06F 11/3684 714/38.1 |

OTHER PUBLICATIONS

Aiken, A., & Gay, D., "Barrier Inference," In Proceedings of the 25th ACM SIGPLAN-SIGACT Symposium on Principles of Programming Languages, pp. 342-354 (Jan. 1998).

Bocchino Jr, R. L. et al., "A type and Effect System for Deterministic Parallel Java," ACM Sigplan Notices, 44(10), pp. 97-116 (Oct. 2009).

Bond, M. D., Coons, K. E., & McKinley, K. S., "Pacer, Proportional Detection of Data Races," ACM Sigplan Notices, 45(6), pp. 255-268 (2010).

Boyapati, C., & Rinard, M., "A Parameterized Type System for Race-Free Java Programs," In ACM SIGPLAN Notices, vol. 36, No. 11, pp. 56-69 (Oct. 2011).

Chen, F., & Ro§u, G., "Parametric and Sliced Causality," In Computer Aided Verification, pp. 240-253, Springer Berlin Heidelberg (Jan. 2007).

Dutertre, B., & De Moura, L., "The Yices SMT Solver," Tool paper at http://yices.csl.sri.com/tool-paper, 2(2) (2006).

Effinger-Dean, L., Lucia, B., Ceze, L, Grossman, D., & Boehm, H. J., "IFRit: Interference-Free Regions for Dynamic Data-Race Detection," In ACM SIGPLAN Notices, vol. 47, No. 10, pp. 467-484 (Oct. 2012).

Elmas, T., Qadeer, S., & Tasiran, S., "Goldilocks: A Race and Transaction-Aware Java Runtime," in ACM SIGPLAN Notices, vol. 42, No. 6, pp. 245-255 (Jun. 2007).

Engler, D., & Ashcraft, K., "RacerX, Effective, Static Detection of Race Conditions and Deadlocks," In ACM SIGOPS Operating Systems Review, vol. 37, No. 5, pp. 237-252 (Oct. 2003).

Erickson, J., Musuvathi, M., Burckhardt, S., & Olynyk, K., "Effective Data-Race Detection for the Kernel," In OSDI, vol. 10, pp. 1-16 (Oct. 2010).

Farchi, E., Nir, Y., & Ur, S., "Concurrent Bug Patterns and How to Test Them," In Parallel and Distributed Processing Symposium Proceedings, International, pp. 7-pp (Apr. 2003).

Flanagan, C., & Freund, S. N., "FastTrack: Efficient and Precise Dynamic Race Detection," in ACM Sigplan Notices vol. 44, No. 6, pp. 121-133 (Jun. 2009).

Herlihy, M. P., & Wing, J. M., "Linearizability: A Correctness Condition for Concurrent Objects," ACM Transactions on Programming Languages and Systems (TOPLAS), 12(3), pp. 463-492 (1990).

Huang, J., & Zhang, C., "Persuasive Prediction of Concurrency Access Anomalies," In Proceedings of the 2011 International Symposium on Software Testing and Analysis, pp. 144-154 (Jul. 2011).

Lamport, L., "Time, Clocks, and the Ordering of Events in a Distributed System," Communications of the ACM, 21(7), pp. 558-565 (1978).

Manson, Jeremy, William Pugh, and Salta V. Adve., "The Java Memory Model," vol. 40., No. 1. ACM (2005).

Marino, D., Musuvathi, M., & Narayanasamy, S., "LiteRace: Effective Sampling for Lightweight Data-Race Detection," In ACM Sigplan Notices, vol. 44, No. 6, pp. 134-143 (Jun. 2009).

Musuvathi, M., Qadeer, S., Ball, T., Basler, G., Nainar, P. A., & Neamtiu, I., "Finding and Reproducing Heisenbugs in Concurrent Programs," in OSDI, vol. 8, pp. 267-280 (Dec. 2008).

Naik, M., Aiken, A., & Whaley, J., "Effective Static Race Detection for Java," vol. 41, No. 6, pp. 308-319 (2006).

O'Callahan, R., & Choi, J. D., "Hybrid Dynamic Data Race Detection," ACM SIGPLAN Notices, 38(10), pp. 167-178 (2003).

Pratikakis, P., Foster, J. S., & Hicks, M., "Locksmith: Context-Sensitive Correlation Analysis for Race Detection," ACM SIGPLAN Notices, 41(6), pp. 320-331(2006).

Said, M., Wang, C., Yang, Z., & Sakallah, K., "Generating Data Race Witnesses by an SMT-Based Analysis," In NASA Formal Methods, pp. 313-327 (2011).

Savage, S., Burrows, M., Nelson, G., Sobalvarro, P., & Anderson, T., "Eraser: A Dynamic Data Race Detector for Multithreaded Programs," ACM Transactions on Computer Systems (TOGS), 15(4), pp. 391-411 (1997).

Sen, K., "Race Directed Random Testing of Concurrent Programs," In ACM SIGPLAN Notices, vol. 43, No. 6, pp. 11-21 (Jun. 2008).

Shacham, O., Sagiv, M., & Schuster, A., "Scaling Model Checking of Dataraces Using Dynamic Information," In Proceedings of the tenth ACM SIGPLAN symposium on Principles and practice of parallel programming, pp. 107-118 (Jun. 2005).

Smaragdakis, Y., Evans, J., Sadowski, C., Yi, J., & Flanagan, C.,"Sound Predictive Race Detection in Polynomial Time," ACM SIGPLAN Notices, 47(1), pp. 387-400 (2012).

Visser, W., Păsăreanu, C. S., & Khurshid, S., "Test Input Generation with Java PathFinder," ACM SIGSOFT Software Engineering Notes, 29(4), pp. 97-107 (2004).

Voung, J. W., Jhala, R., & Lerner, S., "Relay: Static Race Detection on Millions of Lines of Code," In Proceedings of the the 6th joint meeting of the European software engineering conference and the ACM SIGSOFT symposium on the foundations of software engineering, pp. 205-214 (Sep. 2007).

Avgustinov, P., Tibble, J., & de Moor, O., "Making Trace Monitors Feasible," In ACM SIGPLAN Notices, vol. 42, No. 10, pp. 589-608, (Oct. 2007).

Blackburn, S. M., Garner, R., Hoffmann, C., Khang, A. M., McKinley, K. S., Bentzur, R., & Wiedermann, B., "The DaCapo Benchmarks: Java Benchmarking Development and Analysis," In ACM Sigplan Notices, vol. 41, No. 10, pp. 169-190 (Oct. 2006).

Bodden, E., Hendren, L., & Lhoták, O., "A Staged Static Program Analysis to Improve the Performance of Runtime Monitoring," In Proceedings of the 21st European conference on Object-Oriented Programming, pp. 525-549, Springer-Verlag (Jul. 2007).

Chen, F., & Ro§u, G., "Mop: An Efficient and Generic Runtime Verification Framework," In ACM SIGPLAN Notices vol. 42, No. 10, pp. 569-588 (Oct. 2007).

Chen, F., & Ro§u, G., "Parametric and Sliced Causality," In Computer Aided Verification, pp. 240-253,Springer Berlin Heidelberg (Jan. 2007).

Chen, F., Serbanuta, T. F., & Rosu, G., "jPredictor: A Predictive Runtime Analysis Tool for Java," In Proceedings of the 30th international conference on Software engineering, pp. 221-230, (May 2008).

De Moura, L., & Bjorner, N.,"Z3: An Efficient SMT Solver," In Tools and Algorithms for the Construction and Analysis of Systems, pp. 337-340, Springer Berlin Heidelberg (2008).

Farzan, A., Madhusudan, P., Razavi, N., & Sorrentino, F., "Predicting Null-Pointer Dereferences in Concurrent Programs," In Proceedings of the ACM SIGSOFT 20th International Symposium on the Foundations of Software Engineering, p. 47 (Nov. 2012).

Flanagan, C., & Freund, S. N., "Redcard: Redundant Check Elimination for Dynamic Race Detectors," In ECOOP Object-Oriented Programming, pp. 255-280,Springer Berlin Heidelberg (2013).

Huang, J., & Zhang, C., "Persuasive Prediction of Concurrency Access Anomalies," In Proceedings of the International Symposium on Software Testing and Analysis, pp. 144-154 (Jul. 2011).

Huang, J., Zhou, J., & Zhang, C., "Scaling Predictive Analysis of Concurrent Programs by Removing Trace Redundancy," ACM Transactions on Software Engineering and Methodology (TOSEM), 22(1), 8 (2013).

Huang, J., Zhang, C., & Dolby, J., "CLAP: Recording Local Executions to Reproduce Concurrency Failures," In ACM SIGPLAN Notices, vol. 48, No. 6, pp. 141-152 (Jun. 2013).

(56) References Cited

OTHER PUBLICATIONS

Huang, J., Meredith, P. O. N., & Rosu, G., "Maximal Sound Predictive Race Detection with Control Flow Abstraction," ACM SIGPLAN Notices, 49(6), pp. 337-348 (2014).
Joshi, P., Naik, M., Sen, K., & Gay, D., "An Effective Dynamic Analysis for Detecting Generalized Deadlocks," In Proceedings of the eighteenth ACM SIGSOFT international symposium on Foundations of software engineering, pp. 327-336 (Nov. 2010).
Joshi, P., Park, C. S., Sen, K., & Naik, M., A Randomized Dynamic Program Analysis Technique for Detecting Real Deadlocks, ACM Sigplan Notices, 44(6), pp. 110-120 (2009).
Lai, Z., Cheung, S. C., & Chan, W. K., "Detecting Atomic-Set Serializability Violations in Multithreaded Programs through Active Randomized Testing," In Proceedings of the 32nd ACM/IEEE International Conference on Software Engineering—vol. 1, pp. 235-244 (May 2010).
Lam, P., Bodden, E., Lhoták, O., & Hendren, L., "The Soot Framework for Java Program Analysis: A Retrospective", In Cetus Users and Compiler Infastructure Workshop (CETUS ) (Oct. 2011).
Lin, Y., & Dig, D., "Check-then-Act Misuse of Java Concurrent Collections," In Software Testing, Verification and Validation (ICST), IEEE Sixth International Conference on pp. 164-173 (Mar. 2013).
Luo, Q., & Rosu, G., "EnforceMOP: A Runtime Property Enforcement System for Multithreaded Programs," In Proceedings of the 2013 International Symposium on Software Testing and Analysis pp. 156-166 (Jul. 2013).
Martin, M., Livshits, B., & Lam, M. S., "Finding Application Errors and Security Flaws using PQL: A Program Query Language,". In ACM SIGPLAN Notices, vol. 40, No. 10, pp. 365-383 (Oct. 2005).
O'Callahan, R., & Choi, J. D., "Hybrid Dynamic Data Race Detection,". ACM SIGPLAN Notices, 38(10), pp. 167-178 (2003).
Said, M., Wang, C., Yang, Z., & Sakallah, K., Generating Data Race Witnesses by an SMT-Based Analysis. In NASA Formal Methods, pp. 313-327, Springer Berlin Heidelberg (2011).
Sen, K., Rosu, G., & Agha, G., "Runtime Safety Analysis of Multithreaded Programs," In ACM SIGSOFT Software Engineering Notes, vol. 28, No. 5, pp. 337-346 (Sep. 2003).
Sen, K., Ro§u, G., & Agha, G., "Detecting Errors in Multithreaded Programs by Generalized Predictive Analysis of Executions," In Formal Methods for Open Object-Based Distributed Systems, pp. 211-226, Springer Berlin Heidelberg. (2005).
Sorrentino, F., Farzan, A., & Madhusudan, P., "Penelope: Weaving Threads to Expose Atomicity Violations," In Proceedings of the eighteenth ACM SIGSOFT international symposium on Foundations of software engineering, pp. 37-46, (Nov. 2010).
Vaziri, M., Tip, F., & Dolby, J., "Associating Synchronization Constraints with Data in an Object-Oriented language,". In ACM SIGPLAN Notices, vol. 41, No. 1, pp. 334-345 (Jan. 2006).
Kahlon, V., & Wang, C., "Universal Causality Graphs: A Precise Happens-Before Model for Detecting Bugs in Concurrent Programs," In Computer Aided Verification, pp. 434-449 (Jan. 2010).
Wang, C., Kundu, S., Ganai, M., & Gupta, A., "Symbolic Predictive Analysis for Concurrent Programs,". In Formal Methods, pp. 256-272 (2009).
Wang, C., Limaye, R., Ganai, M., & Gupta, A., "Trace-Based Symbolic Analysis for Atomicity Violations," In Tools and Algorithms for the Construction and Analysis of Systems, pp. 328-342 (2010).
Wang, L., & Stoller, S. D., "Accurate and Efficient Runtime Detection of Atomicity Errors in Concurrent Programs,". In Proceedings of the eleventh ACM SIGPLAN symposium on Principles and practice of parallel programming, pp. 137-146 (Mar. 2006).
Joshi, P., & Sen, K., "Predictive Typestate Checking of Multithreaded Java Programs," In Proceedings of the 23rd IEEE/ACM International Conference on Automated Software Engineering, pp. 288-296 (Sep. 2008).
Gao, Q., Zhang, W., Chen, Z., Zheng, M., & Qin, F., "2ndStrike: Toward Manifesting Hidden Concurrency Typestate Bugs,". ACM SIGPLAN Notices, 47(4), pp. 239-250 (2012).
Park, C. S., & Sen, K., "Randomized Active Atomicity Violation Detection in Concurrent Programs,". In Proceedings of the 16th ACM SIGSOFT International Symposium on Foundations of software engineering, pp. 135-145 (Nov. 2008).
Concurrent Modification Exception when using Marker Axis Band, http://sourceforge.net/p/jfreechart/bugs/1051/, Accessed (Aug. 24, 2015).
Eclipse, Virgo, http://www.eclipse.org/virgo/, Accessed (Aug. 24, 2015).
Oracle, Java Bug Database, http://bugs.java.com/bugdatabase/view%20bug.do?bug%20id=6487638, Accessed (Aug. 24, 2015).
Derby, Thread Safety Issue in Table Descriptor, https://issues.apache.org/jira/browse/DERBY-2861, Accessed (Aug. 25, 2015).
Serbanuta et al., "Maximal Causal Models for Sequentially Consistent Systems," Technical Report http://hdl.handle.net/2142/27708, University of Illinois at Urbana-Champaign, 26 pages, Oct. 2011.
Derby, "Assert failure in CacheEntry.unkeepForRemove when running stress.multi," https://issues.apache.org/jira/browse/DERBY-3786, 4 pages, Jul. 2008.

\* cited by examiner

```
initially  x=y=0   resource z=0
     Thread t1              Thread t2
1.  fork t2
2.  lock l
3.  x = 1
4.  y = 1
5.  unlock l
                      6.  { //begin
                      7.   lock l
                      8.   r1 = y
                      9.   unlock l
                      10.  r2 = x
                      11.  if(r1 == r2)
                      12.    z = 1   (auth)
                      13. } //end
14. join t2
15. r3 = z   (use)
16. if(r3 == 0)
17.   Error
```

FIG. 1

```
      initially  x=y=0   y is volatile
       Thread t1              Thread t2
1.  x = 1
2.  y = 1
                      3. ① r1 = y  ② while(y == 0);
                      4.  r2 = x
```

FIG. 2

$$
\begin{aligned}
\textit{Event} \;::=\; & \textit{begin}(t) \;\mid\; \textit{end}(t) \\
& \textit{write}(t,x,v) \;\mid\; \textit{read}(t,x,v) \\
& \textit{acquire}(t,l) \;\mid\; \textit{release}(t,l) \\
& \textit{fork}(t,t') \;\mid\; \textit{join}(t,t') \\
& \textit{branch}(t)
\end{aligned}
$$

$t, t' \in \textit{Thread};\; x \in \textit{Variable};\; l \in \textit{Lock};\; v \in \textit{Value}$

FIG. 3 initially $x = y = z = 0$

1. $\textit{fork}(t1, t2)$
2. $\textit{acquire}(t1, l)$
3. $\textit{write}(t1, x, 1)$
4. $\textit{write}(t1, y, 1)$
5. $\textit{release}(t1, l)$ 6. $\textit{begin}(t2)$
      7. $\textit{acquire}(t2, l)$
      8. $\textit{read}(t2, y, 1)$
      9. $\textit{release}(t2, l)$
      10. $\textit{read}(t2, x, 1)$
      11. $\textit{branch}(t2)$
      12. $\textit{write}(t2, z, 1)$
      13. $\textit{end}(t2)$ 14. $\textit{join}(t1, t2)$
15. $\textit{read}(t1, z, 1)$
16. $\textit{branch}(t1)$

FIG. 4

A. MHB ($\Phi_{mhb}$)
$$O_1 < O_2 < \ldots < O_5 \quad O_{14} < \ldots < O_{16}$$
$$O_6 < O_7 < \ldots < O_{13}$$
$$O_1 < O_6 \wedge O_{13} < O_{14}$$

B. Locking ($\Phi_{lock}$) $\quad O_5 < O_7 \vee O_{13} < O_2$

C. (3,10) Race ($\Phi_{race}$) $\quad O_{10} - O_3 = 1$

C. (12,15) Race ($\Phi_{race}$) $\quad \begin{array}{l} O_{15} - O_{12} = 1 \\ O_3 < O_{10} \wedge O_4 < O_8 \end{array}$

FIG. 5

*initially* $x=0$

Thread $t1$      Thread $t2$
1. *lock l*
2. $a[x] = 2$
3. *unlock l*
     4. *lock l*
     5. $x = 1$
     6. *unlock l*
     7. $a[0] = 1$

FIG. 6

| 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|
| | | | | Trace | | | | Data race | | | | Time | | | |
| Program | LOC | #Thrd | #Event | #RW | #Sync | #Br | OC | RV | Said | CP | HB | RV | Said | CP | HB |
| example | 64 | 2 | 20 | 12 | 6 | 2 | 1 | 1 | 0 | 0 | 0 | 0.4s | 0.8s | 0.8s | 0.8s |
| critical | 63 | 3 | 38 | 23 | 4 | 11 | 8 | 8 | 7 | 4 | 4 | 0.9s | 0.8s | 0.8s | 0.8s |
| airline | 83 | 11 | 214 | 127 | 10 | 77 | 9 | 9 | 6 | 8 | 8 | 0.9s | 1.0s | 0.8s | 0.8s |
| account | 87 | 3 | 128 | 82 | 2 | 42 | 9 | 5 | 4 | 3 | 3 | 0.8s | 0.8s | 0.8s | 0.9s |
| pingpong | 124 | 5 | 64 | 40 | 5 | 19 | 7 | 5 | 5 | 3 | 3 | 0.8s | 0.8s | 0.9s | 0.9s |
| bbuffer | 334 | 4 | 1.7K | 975 | 209 | 497 | 15 | 13 | 10 | 5 | 5 | 4.1s | 6.8s | 1s | 1s |
| bubblesort | 274 | 26 | 4.5K | 2.3K | 188 | 2K | 17 | 8 | 8 | 7 | 7 | 7.4s | 4.4s | 1.3s | 1.2s |
| bufwriter | 199 | 5 | 411 | 242 | 36 | 133 | 18 | 2 | 0 | 2 | 2 | 1s | 1.2s | 0.8s | 0.8s |
| mergesort | 298 | 5 | 5.5K | 2.9K | 122 | 2.5K | 16 | 9 | 7 | 3 | 3 | 2.5s | 7.9s | 1.2s | 1.2s |
| raytracer | | 2 | 23.4K | 17.7K | 674 | 5.3K | 5 | 0 | 5 | 0 | 0 | 1.2s | 3.4s | 1.2s | 1.2s |
| montecarlo | | 2 | 11.7M | 7.2M | 285K | 4.1M | 509 | 11 | 0 | 0 | 0 | 13.5s | 13.7s | 14.2s | 12s |
| maldyn | | 2 | 273K | 193K | 64 | 79.5K | 614 | 0 | 5 | 2 | 2 | 53.5s | 170s | 1.2s | 1.6s |
| Total: bench | 2.9K | | | | | | 1025 | 75 | 57 | 40 | 40 | | | | |
| tsp server | 4.3K | 12 | 59K | 40.3K | 7.7K | 10.7K | 233 | 37 | 5 | 31 | 27 | 3s | 9s | 1s | 1.3s |
| jigsaw | 32K | 12 | 4.6M | 3M | 15.5K | 1.6M | 54 | 15 | 14 | 7 | 7 | 81s | 92s | 6.2s | 5.9s |
| derby | 101K | 3 | 856K | 613K | 38K | 205K | 469 | 118 | 15 | 13 | 12 | 1820s | 1h | 24s | 2s |
| xmlflow | 302K | 9 | 14.8M | 7.7M | 482 | 7.05M | 66 | 2 | 2 | 2 | 2 | 14.6s | 14.5s | 14.4s | 14.5s |
| xalan | 109K | 9 | 12.5M | 6.9M | 130K | 5.5M | 188 | 108 | 107 | 5 | 3 | 14.6s | 14.6s | 13.5s | 12.5s |
| lusearch | 183K | 10 | 11.3M | 6.7M | 30.6K | 4.6M | 87 | 16 | 15 | 15 | 15 | 12.1s | 12.8s | 12.3s | 11.9s |
| eclipse | 560K | 10 | 14.3M | 7.6M | 644K | 6.05M | 8 | 3 | 2 | 2 | 2 | 17.3s | 23.6s | 37.2s | 14.5s |
| Total: real | 1.7M | | | | | | | 299 | 138 | 76 | 68 | | | | |

FIG. 7

```
Collection<Item> c;
Item A, B;  Iterator i1, i2;
     T1              T2
1: c.add(A);
2: start T2;          5: c.add(B);
3: i1=c.iterator();   6: i2=c.iterator();
4: i1.next()          7: i2.next()
```

Fig. 2. A collection iterating example

FIG. 8

| | | |
|---|---|---|
| *<GPredict Specification>* | ::= | *<Property Name>* "(" *<Parameters>* ")" "{" *<Event>** *<Pattern>* "}" |
| *<Event>* | ::= | "event" *<Id>* *<AspectJ AdviceSpec>* ":" *<AspectJ Pointcut>* |
| *<Pattern>* | ::= | "pattern :" (*<RegExp>* "||")* *<RegExp>* |
| *<Property Name>* | ::= | *<Identifier>* |
| *<Parameters>* | ::= | (*<Type>* *<Identifier>*)* |
| *<Id>* | ::= | *<Identifier>* |
| *<AspectJ AdviceSpec>* | ::= | AspectJ AdviceSpec syntax |
| *<AspectJ Pointcut>* | ::= | AspectJ Pointcut syntax |
| *<Thread>* | ::= | *<Identifier>* |
| *<AtomRegion>* | ::= | *<Identifier>* |
| *<Identifier>* | ::= | Java Identifier syntax |
| *<Begin>* | ::= | "<"*<AtomRegion>* |
| *<End>* | ::= | ">"*<AtomRegion>* |
| *<RegExp>* | ::= | Regular expression over {*<Id>*, *<Id>*"("*<Thread>*,*<Begin>* \| *<End>*")"} |

FIG. 9

```
UnsafeIterator (Collection c, Iterator i) {
    event create after(Collection c) returning(Iterator i) :
        call(Iterator Collection+.iterator()) && target(c);
    event update after(Collection c) :
        (call(* Collection+.remove*(..))
        || call(* Collection+.add*(..)) ) && target(c);
    event next before(Iterator i) :
        call(* Iterator.next()) && target(i);

pattern: create next* update+ next
}
```

FIG. 10

```
AtomicityViolation (Object o){
    event begin before(Object o): execution(m());
    event read before(Object o): get(* s) && target(o);
    event write before(Object o): set(* s) && target(o);
    event end after(Object o): execution(m());

pattern: begin(t1,<r1) read(t1) write(t2) write(t1) end(t1,>r1)
}
```

```
DataRace (Object o) {
    event read before(Object o): get(* s) && target(o);
    event write before(Object o): set(* s) && target(o);

pattern: read(t1) || write(t2)
}
```

```
public void addChangeListener(SeriesChangeListener listener) {
    this.listeners.add(listener);
}
public void fireSeriesChanged() {
    notifyListeners(new SeriesChangeEvent(this));
}
protected void notifyListeners(SeriesChangeEvent event) {
    Iterator iterator = listeners.iterator();
    while (iterator.hasNext()) {
        SeriesChangeListener listener =
                    (SeriesChangeListener) iterator.next();
        listener.seriesChanged(event);}
}
```

FIG. 16

Derby bug #2861
```
class TableDescriptor
public String getObjectName() {
    if(referencedColumnMap ==null) {...}
    else {
        if(referencedColumnMap.isSet(...)){...}
    }
}
public void setReferenceColumnMap(..) {
    referencedColumnMap=null;
}
```

```
NullPointerDereference (Object o) {
    event deRef before(Object o):
        get(TableDescriptor.referenceColumnMap)&&target(o);
    event setNull before(Object o, Object value):
        set(*TableDescriptor.referenceColumnMap)
            && target(o)&&args(value)&&if(value==null);

pattern: deRef(t1) || setNull(t2)
}
```

FIG. 17

| Program | LOC | Property | #Threads | #Model events | #Property events | #Violations | Time |
|---|---|---|---|---|---|---|---|
| jfreechart | 51k | UnsafeIterator | 21 | 140 | 90 | 20 | 0.85s |
| h2 | 136k | UnsafeDatabaseAccess | 5 | 112 | 14 | 16 | 0.67s |
| derby1 | 302k | NullPointerDereference | 3 | 12527 | 27 | 5 | 4.7s |
| derby2 | 368k | Check-Then-Act | 3 | 19889 | 1325 | 4 | 8.5s |
| jigsaw | 101k | Data race | 12 | 17089 | 38 | 29 | 17.6s |
| stringbuffer | 358 | Atomicity violation | 3 | 58 | 6 | 2 | 0.4s |
| jdk-logger | 2387 | Deadlock | 2 | 309 | 61 | 1 | 2.6s |

FIG. 18

```
UnsafeDatabaseAccess(Connection conn, String table) {
    event open after() returning(Connection conn):
        call(Connection DriverManager.getConnection(String));
    event close before(Connection conn):
        call(void Connection.close())&&target(conn);
    event create before(Connection conn, String table):
        call(* createTable(Connection conn, String table))&&args(conn,table);
    event delete before(Connection conn, String table):
        call(* deleteTable(Connection conn, String table))&&args(conn,table);
    event update before(String table, String sql):
        call(boolean Statement.execute(String))
            &&args(sql)&&if(sql.contains(table));

pattern : !(open create update delete close)
}
```

FIG. 19

Derby bug #3786
```
class GenericLanguageConnectionContext
public void removeStatement(...) {
    Cacheable cachedItem =
        statementCache.findCached(statement);
    if (cachedItem != null)
        statementCache.remove(cachedItem);
}
```

```
CheckThenAct (Map m, Object key) {
    event check after(Map m, Object key):
        call(* Map+.get(Object))&&target(m)&&args(key);
    event act before(Map m, Object key) :
        call(* Map+.remove(Object,..))&&target(m)&&args(key,..);

pattern: check(t1) act(t2)+ act(t1)
}
```

FIG. 20

| Program | #Threads | Base | Global | GPredict |
|---|---|---|---|---|
| avrora | 4 | 1.8s | 2m20s | 2m6s (-10%) |
| batik | 2 | 2.1s | 2m28s | 1m2s (-58%) |
| xalan | 11 | 1.7s | 6m14s | 1m9s (-82%) |
| lusearch | 10 | 1.4s | 15m17s | 3m16s (-78%) |
| sunflow | 25 | 1s | 19m48s | 11m28s (-42%) |

FIG. 21

MAXIMIZING CONCURRENCY BUG DETECTION IN MULTITHREADED SOFTWARE PROGRAMS

FEDERALLY SPONSORED RESEARCH

This invention was made with Government support under government contract number CCF-0448501 awarded by the National Science Foundation. The United States Government has certain rights in the invention.

TECHNICAL FIELD

The present disclosure relates to maximal and sound detection (and prediction) of a trace property whose violation corresponds to a concurrency bug of a multithreaded, concurrent software program.

BACKGROUND

Some of the worst concurrency problems in multithreaded systems today are due to data races, which occur when there are unordered conflicting accesses in a program without proper synchronization. Data races are particularly problematic because data races manifest non-deterministically, often appearing only on very rare executions, making them notoriously difficult to test and debug.

Despite the numerous static and dynamic program analysis techniques in the literature, data races remain one of the most common bugs in modern concurrent software. Further, the techniques that do exist either have limited detection capability or are unsound, meaning that the techniques report false positives.

The present disclosure additionally addresses the detection and prediction of other violations such as atomicity violations, deadlocks, and null pointer dereferences, in addition to more generic properties typically not detected by current testing methods.

Predictive trace analysis (PTA) is an effective approach for detecting subtle bugs in concurrent programs. Existing PTA techniques, however, are typically based on ad-hoc algorithms tailored to low-level errors such as data races or atomicity violations, and are not applicable to high-level properties such as "a resource must be authenticated before use" and "a collection cannot be modified when being iterated over." In addition, most techniques assume as input a globally ordered trace of events, which is expensive to collect in practice, as these techniques require synchronizing all threads.

Accordingly, there are a number of disadvantages with conventional methods of detecting and predicting violations or bugs in concurrent, multithreaded programs.

BRIEF DESCRIPTION OF THE DRAWINGS

A more particular description of the disclosure briefly described above will be rendered by reference to the appended drawings. Understanding that these drawings only provide information concerning typical embodiments and are not therefore to be considered limiting of its scope, the disclosure will be described and explained with additional specificity and detail through the use of the accompanying drawings.

FIG. 1 is an example program with a data race (3, 10) between two threads.

FIG. 2 is another example program with a data race conditional on branching execution.

FIG. 3 is a list of events as represented and discussed within the present disclosure.

FIG. 4 is an example trace through the example program of FIG. 1.

FIG. 5 is a list of constraint models based on the example trace in FIG. 4.

FIG. 6 is yet another example program having two threads, this one with locking and unlocking operations in each thread.

FIG. 7 is a table of results of race detection of various traces and their metrics, including detection capability of the present methods compared to certain benchmarks.

FIG. 8 is a collection-iterating example that accesses a shared collection across two different threads.

FIG. 9 is a representative list of examples of property specification language as employed in the present disclosure.

FIG. 10 is an example of the UnsafeIterator property in the disclosed specification.

FIG. 11 is an example of a read-write-write atomicity violation written in the specification language of FIG. 9.

FIG. 12 is a program with atomicity violations corresponding to those written in FIG. 11.

FIG. 16 is an example program including a real bug violating the UnsafeIterator property.

FIG. 17 is an example descriptor and trace, exemplifying a null-pointer dereference specification.

FIG. 18 is a table containing results from running the disclosed analysis on six programs and libraries and examined properties including data races, atomicity violations, and deadlocks.

FIG. 19 is an example specification of an UnsafeDatabaseAccess property.

FIG. 20 is an example of a Check-Then-Act property articulated in the disclosed language.

FIG. 21 is a table showing experimental results, including time to detect violations, from running the disclosed analysis using widely used third-party concurrency benchmarks.

DETAILED DESCRIPTION

Figures 13, 14, 15:
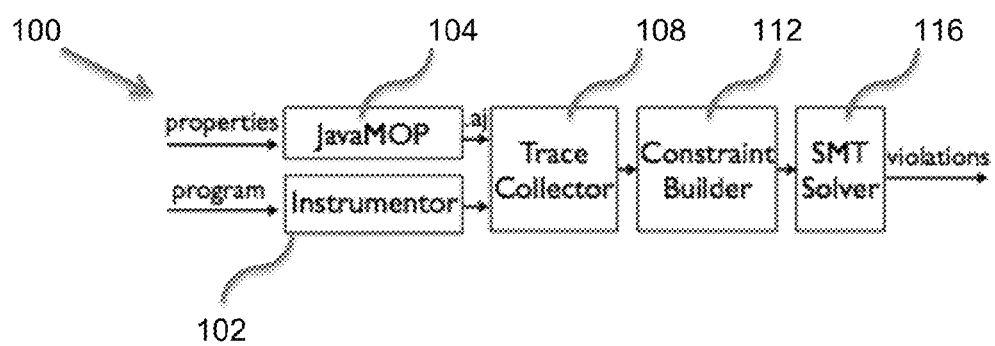
FIG. 13 is an example of the specification of a read-write data race property on a shared variable s.
FIG. 14 is an example program with three threads and that exemplifies thread synchronization constraints that are captured by the disclosed methods.
FIG. 15 is a system diagram depicting different components and corresponding processing to implement the disclosed detection and prediction methods.

The present disclosure relates to systems and methods that incorporate a sound and maximal causal model with control flow information for maximum concurrency error detection in general multithreaded programs. The maximal causal model may be based on or integrated with the sequential consistency model. By way of example, this new model may be employed specifically for maximum, sound race detection in multithreaded programs subject to concurrency errors. The present disclosure proves that the disclosed system and technique detects all races by any sound race detector based on the same execution trace. The present disclosure also presents an efficient implementation and extensive evaluation of the technique, demonstrating the practicality and race detection capability in real world concurrent systems.

The present disclosure also relates to predictive trace analysis (PTA) for predicting generic concurrency properties using local traces (as opposed to a global trace) through the threads of a multithreaded program. This approach incurs much less runtime overhead than existing systems and techniques. By uniformly modeling violations of concurrency properties and the thread causality as constraints over events, and using an SMT (satisfiability modulo theories) solver, the disclosed system ("GPredict") can predict property violations allowed by the causal model. Through our evaluation using both benchmarks and real world applications, we show that the system is effective in expressing and predicting generic property violations. Moreover, GPredict reduces the runtime overhead of existing techniques by 54% on average on DaCapo benchmarks.

Even though a recent development, causally-precedes (CP), improves the detection power by soundly relaxing the happens-before (HB) edges between critical sections that have no conflicting accesses, CP can still miss many races. (Note the CP work referred to herein: Y. Smaragdakis, J. Evans, C. Sadowski, J. Yi, and C. Flanagan. Sound predictive race detection in polynomial time, in *POPL*, 2012. Also note the HB work referred to herein: L. Lamport, Time, clocks, and the ordering of events in a distributed system, *CACM*, 1978.) Consider, for example, an execution of the program in FIG. 1. The program contains a race between lines (3,10) that may cause an authentication failure of resource z at line 12, which in consequence causes an error to occur when z is used at line 15. Supposing the execution follows an order denoted by the line numbers, however, CP cannot detect this race because line 3 causally-precedes line 10, for the reason that the two lock regions contain conflicting accesses to y. PECAN, another representative technique that uses a hybrid algorithm combining lockset and a weaker form of HB, is able to detect this race by ignoring the HB edges between critical regions. See J. Huang and C. Zhang, PECAN: Persuasive prediction of concurrency access anomalies, in *ISSTA*, 2011 (hereinafter "PECAN"). However, the hybrid algorithm is unsound in general. For example, if we switch lines 1 and 2, (3,10) is no longer a race (because then line 10 will always happen-after line 3), but PECAN will still report it.

In the present disclosure, we present a sound, dynamic race detection technique that achieves a much higher detection capability than existing techniques. Control flow information between events in the execution (often ignored by existing techniques) can help significantly improve the race detection ability. Consider the scenario in FIG. 2 where y is volatile and line 3 has two cases: ① r1=y and ② while (y==0). For case ①, (1,4) is a race on x; while for case ②, it is not, because line 4 is control-dependent on the while loop at line 3. However, without considering the control dependence between operations, the dynamic execution traces for these two cases are identical (both following lines 1-2-3-4). Hence, a sound technique conservatively assumes that a value read by a thread influences all subsequent values produced by the same thread, which, in consequence, creates a HB edge from line 2 to line 3 and misses the race in case ①. However, with the control flow information, we can tell that, in case ①, line 4 is not control-dependent on line 3. In other words, regardless of what value line 3 reads, line 4 will always be executed. We can, therefore, safely drop the HB edge from line 2 to line 3, which enables detecting the race (1,4). Similarly, we are able to detect the race (3,10) in FIG. 1 by dropping the HB edge from line 4 to line 8, because there is no control flow from line 8 to line 10 and hence no need to ensure line 8 should read value 1 (written by line 4).

Accordingly, the disclosed methods add a new type of event (branch) into the execution model. Observing branch events is cheap at run-time; however, branch events provide an abstract view of the control flow information between events that enable a higher race detection power. Moreover, we develop a weaker maximal causal model that incorporates control flow information under the sequential consistency memory model. Underpinned by the new model, we design a maximal race detection algorithm that encodes all the valid trace re-orderings allowed by the model as a set of first-order logical constraints, and uses an SMT solver to find races. By formulating race detection as a constraint solving problem, the disclosed technique is both sound and maximal: every race it detects is real, accompanying with a valid trace that can manifest it, and the technique detects all the possible races that can be detected by any sound technique based on the same trace.

In contrast to conventional methods, the disclosed technique addresses read-write consistency from the perspective of control dependence, and generates only the constraints with respect to the events that have control flow to the race related operations. Hence, the technique is able to detect races in all feasible incomplete traces as well.

The present system is designed for Java, although the same principles apply to any programming language. We have conducted extensive evaluation and comparison with the state-of-the-art sound race detection techniques—HB, CP, and Said, C. Wang, Z. Yang, and K. Sakallah, Generating data race witnesses by an SMT-based analysis. In NFM, 2011 ("Said et al.")—on a wide range of popular multithreaded benchmarks as well as real world large concurrent systems. Experimental results show that our system and technique detects significantly more races than these other approaches, demonstrating the theoretically higher race detection capability of our approach with the control flow abstraction. Moreover, our technique is practical: it has been applied to real complex executions with tens of millions of critical events and is highly effective in detecting real races. For the seven real systems, our system detected 299 real races in total. Comparatively, HB, CP, and Said et al. only detected 68, 76, and 158 races, respectively. Our experiments also revealed 11 previously unknown races in these real systems that have been confirmed or fixed by the developers. Because of our bug reports in Eclipse, the developers have adopted our system on the codebase of Eclipse Virgo.

Maximal Causal Model With Control Flow

The maximal causal model with control flow paves the theoretical foundation for maximal dynamic concurrency error detectors, such as the disclosed race detection technique. Multithreaded programs $\mathcal{P}$ are abstracted as the prefix-closed sets of finite traces of events that the programs can produce when completely or partially executed, called $\mathcal{P}$-feasible traces. Such sets of traces can be constructed for each $\mathcal{P}$ using, for example, a formal semantics of the target programming language. Regardless of the programming language and of how sets are defined, the sets of $\mathcal{P}$-feasible traces obey some basic consistency axioms, such as sequential consistency requirements.

The axioms allow associating a sound and maximal causal model feasible($\tau$) to any consistent trace $\tau$, which includes precisely the traces that can be generated by all programs that can generate $\tau$. Conventional happens-before (HB) causal models consist of the legal inter-leavings of $\tau$ and corresponding prefixes are not maximal. The maximal causal model allows us to define a maximal notion of race: trace $\tau$ has a race if there is some $\tau' \in \text{feasible}(\tau)$ which contains two consecutive events by different threads that access the same location, at least one of them corresponding to a write.

Events

The execution environment contains a set of concurrent objects (shared locations, locks, etc.), which are accessed by arbitrarily many threads to share data and synchronize. A concurrent object is behaviorally defined through a set of atomic operations and a serial specification of its legal behavior in isolation. For example, a shared memory location is a concurrent object with read and write operations, whose serial specification states that each read yields the same value as the one of the previous write. A (non-reentrant) lock is an object with acquire and release operations, whose serial specification consists of operation sequences in which the difference between the number of acquire and release operations is either 0 or 1 for each prefix, and all consecutive pairs of acquire-release share the same thread. Virtually all concurrency constructs fall under this simple and general notion of concurrent object (including reentrant locks, fork/join, wait/notify, etc.).

Events are operations performed by threads on concurrent objects, abstracted as tuples of attribute-value pairs. For example, (thread=$t_1$, op=write, target=x, data=1) is a write event by thread $t_1$ to memory location x with value 1. When there is no confusion, we take the freedom to use any other meaningful notation for events. For example, write($t_1$, x, 1). For any event e and attribute attr, attr(e) denotes the value corresponding to the attribute attr in e, and e[v/attr] denotes the event obtained from e by replacing the value of attribute attr by v. The theoretical results in this section hold for any types of events corresponding to any concurrent objects whose behaviors can be described with serial specifications. However, for clarity, we instantiate our subsequent notions and results to the following common event types:

begin(t)/end(t): the first/last event of thread t;
read(t, x, v)/write(t, x, v): read/write a value v on a variable x;
acquire(t, l)/release(t, l): acquire/release a lock l;
fork(t, t'): fork a new thread t';
join(t, t'): block until thread t' terminates;

In addition to the above events, we consider a new branch event:

branch(t): jump to a new operation.

The semantics of this new type of event cannot be given as a serial specification. In fact, branch events can appear anywhere in the trace. To state briefly, the branch event serves as a guard of a possible control flow change, which determines the next operation to execute in a thread. The choice depends on some computation local to the thread, for example the result of an expression in a conditional statement, which is unknown in the event and is not visible to other threads. Hence, conservatively, we assume that the choice of branch(t) depends on all the previous read(t, x, v) operations executed by the same thread.

FIG. 3 is a list of events as represented and discussed within the present disclosure, highlighting the novel branch event.

Traces

An execution trace is abstracted as a sequence of events. Given a trace t and any set S of concurrent objects, threads, or event types, we let $\tau \restriction s$ denote the restriction of $\tau$ to events involving one or more of the elements in S. For example, if o is a concurrent object then $\tau \restriction_o$ is the restriction of $\tau$ to events involving o; if t is a thread then $\tau \restriction_t$ contains only the projection of $\tau$ to events by thread t; $\tau \restriction_{t,o}$ is the projection of $\tau$ to events by thread t involving object o; $\tau \restriction_{t,read}$ the projection to read events by thread t; etc. If e is an event in trace $\tau$ then let $\tau_e$ denote the prefix of $\tau$ up to and including e: if $\tau = \tau_1 e \tau_2$ then $\tau_e$ is $\tau_1 e$. Let $\text{last}_{op}(\tau)$ be the last event of $\tau$ corresponding to operation op; e.g., $\text{last}_{write}(\tau)$ is the last write event of $\tau$.

An interleaving of $\tau$ is a trace $\tau'$ such that $\tau' \restriction_t = \tau \restriction_t$ for each thread t. Trace $\tau$ is (sequentially) consistent iff $\tau \restriction_o$ satisfies o's serial specification for any object o. Despite its simplicity, this notion of consistency based on concurrent object serial specifications is quite general. If all the events considered are those in FIG. 3, then the consistency of $\tau$ can be precisely summed up with the following:

Read Consistency: A read event contains the value written by the most recent write event on the same memory location. Formally, if e is a read event of $\tau$ then data(e)=data($\text{last}_{write}(\tau_e \restriction_{target(e)})$).

Lock Mutual Exclusion: Each release event is preceded by an acquire event on the same lock by the same thread, and each pair is not interleaved by any other acquire or release event on the same lock. Formally, for any lock l, if $\tau \restriction_l = e_1 e_2 \ldots e_n$ then $\text{op}(e_k)$=acquire for all odd indexes k≤n, $\text{op}(e_k)$=release for all even indexes k≤n, and thread($e_k$)=thread($e_{k+1}$) for all odd indexes k with k<n.

Must Happen-Before: A begin event can happen only as a first event in a thread and only after the thread is forked by another thread: for any event e=begin(t') in $\tau$, the trace $\tau \restriction_{t'}$ starts with e and there exists precisely one fork(t, t') event in $\tau_e$. An end event can happen only as the last event in a thread, and a join event can happen only after the end event of the joined thread: for any event e=end(t') in $\tau$, the trace $\tau \restriction_{t'}$ terminates with e; also, for any event e=join(t, t'), the event end(t') is in $\tau_e$.

Since the branch events do not have serial specifications, branch events are allowed to appear anywhere in a trace without affecting the consistency of the trace. FIG. 4 shows the (consistent) trace corresponding to our example in FIG. 1. Note that read and write to local data (i.e., r1, r2, r3) are not included, as they are not needed for race detection and are also expensive to track in practice.

Feasibility Axioms

Consistency is a property of a trace alone, stating that all the serial specifications describing the legal behaviors of the involved concurrent objects are met. Any (complete or incomplete) trace produced by a running program is expected to be consistent. However, the various consistent traces that can be generated by a multithreaded program are not unrelated. Let feasible($\mathcal{P}$) be the set of all traces that can be produced by a hypothetical program $\mathcal{P}$, which we call $\mathcal{P}$-feasible traces. The most common characterizing axiom of feasible($\mathcal{P}$), rooted in Lamport's happens-before causality and Mazurkiewicz's trace theory, is to require feasible($\mathcal{P}$) be closed under consistent interleavings. For the trace in FIG. 4, for example, this indicates that consistent interleavings such as 1-6-2-3-4-5-7-8-9 . . . and 1-2-6-3-4-5-7-8-9 . . . , where we refer to events by their line numbers, are also $\mathcal{P}$-feasible, regardless of the program $\mathcal{P}$ that generated the original trace. This axiom is, however, too strong. What we want is the weakest axioms of feasible($\mathcal{P}$), which will give the resulting concurrency error detection technique the largest coverage.

Two weaker axioms governing feasible($\mathcal{P}$) include prefix closedness and local determinism. The former says that the prefixes of a $\mathcal{P}$-feasible trace are also $\mathcal{P}$-feasible. The latter says that each thread has a deterministic behavior, that is, only the previous events of a thread (and not other events of other threads) determine the next event of the thread; although if that event is a read then it is allowed to get its value from the latest write. Formally, if $\tau_1 e_1, \tau_2 \in \text{feasible}(\mathcal{P})$ and $\tau_1 \upharpoonright_{thread(e_1)} = \tau_2 \upharpoonright_{thread(e_1)}$ then (1) if $\tau_2 e_1$ is consistent then $\tau_2 e_1 \in \text{feasible}(\mathcal{P})$, and (2) if $op(e_1)$=read and there exists some event $e_2$ with $e_2[\text{data}(e_1)/\text{data}]=e_1$ and $\tau_2 e_2$ consistent, then $\tau_2 e_2 \in \text{feasible}(\mathcal{P})$. Unlike the consistent interleavings axiom underlying the usual happens-before, these weaker axioms allow us to infer from the trace in FIG. 4 that the consistent trace 1-6-7-8' is also $\mathcal{P}$-feasible regardless of the program $\mathcal{P}$ that generated the original trace, where 8' is the event read(t2, y, 0) which reads 0, the value written initially to y, instead of 1 as the original event 8. Note, however, that the trace 1-6-7-8'-9 cannot be inferred as $\mathcal{P}$-feasible with the axioms and model in a prior work without control flow, because the projections of 1-6-7-8 and 1-6-7-8' to thread t2 are not equal. It would in fact be unsound to allow the trace 1-6-7-8'-9 to be inferred as P-feasible, because the read of 1 for y in event 8 may be part of the condition in a conditional statement in $\mathcal{P}$, and the release event 9 generated by a branch that would not be taken if y were 0.

The weakest possible axioms of feasibility that take into account our new branch events may be the strongest approach. Consider, for example, an assignment x=y+1 inside a branch that has just been taken. The read of y and the write of x will happen unconditionally; other threads may at most change the data values of these events (in a sequentially consistent manner), but the read of y and the write of x cannot affect the existence of the events themselves. Moreover, the write of x event contains the same value, provided that the read of y event reads the same value. Similarly, the existence of concurrent operations inside the taken branch is conditioned only by global sequential consistency constraints, but not by the particular data values read or written by the current thread. Hence, the fact that the branch events alone determine the control flow in the original program allows us to significantly relax the requirement of the local determinism axiom that traces $\tau_1$ and $\tau_2$ have identical projections on e's thread t in order for $\tau_1 e$ $\mathcal{P}$-feasible to determine the next event by t in the $\mathcal{P}$-feasible extensions of $\tau_2$. Instead, we can now only require the two projections to be equal except for the data values in write and read events. However, since the branch and write events depend upon the evaluation of thread-local expressions that are not available in the execution trace, we conservatively assume that these events depend upon all the reads by the same thread.

Let $\mathcal{F}$ be a set of traces. Below we identify five axioms for $\mathcal{F}$ to be feasible. The intuition is that the set of traces that can be generated by a multithreaded program is such a feasible set.

(1) Prefix Closedness: $\mathcal{F}$ is prefix closed: if $\tau_1 \tau_2 \in \mathcal{F}$ then $\tau_1 \in \mathcal{F}$. Prefix closedness ensures that events are generated in execution order, with the possibility of interleaving in-between any of them.

For the remaining axioms, suppose that $\tau_1 e_1, \tau_2 \in \mathcal{F}$, that thread($e_1$)=t, and that $\tau_1 \upharpoonright_t \approx \tau_2 \upharpoonright_t$, where two traces are in the $\approx$ relation, called data-abstract equivalence, if they are equal except for the data values in read and write events. The next axioms state the thread-local determinism requirements. Specifically, these axioms state that under the above thread-local data-abstract equivalence condition between $\tau_1$ and $\tau_2$, the trace $\tau_2$ can only continue with a well-determined event of t, which is data-abstract equivalent to $e_1$.

Local Determinism: Each event is determined by the previous events in the same thread and can occur at any consistent moment after them. There are four cases to distinguish:

(2) Branch. If op($e_1$)=branch and $\tau_1 \upharpoonright_{t,read} = \tau_2 \upharpoonright_{t,read}$, then $\tau_2 e_1 \in \mathcal{F}$.

(3) Read. If op($e_1$)=read and $e_2$ is a (read) event such that $e_2[\text{data}(e_1)/\text{data}]=e_1$ and $\tau_2 e_2$ is consistent, then $\tau_2 e_2 \in \mathcal{F}$.

(4) Write. If op($e_1$)=write then there is a v such that $\tau_2 e_1[v/\text{data}] \in \mathcal{F}$; moreover, if $\tau_1 \upharpoonright_{t,read} = \tau_2 \upharpoonright_{t,read}$ then v=data($e_1$).

(5) Other. If op($e_1$)$\notin$\{branch, read, write\} and $\tau_2 e_1$ is consistent, then $\tau_2 e_1 \in \mathcal{F}$.

DEFINITION 1. A set of traces $\mathcal{F}$ is feasible if it satisfies the prefix closedness and the local determinism axioms above.

In addition to all the consistent interleavings and feasible sets of traces derived from the trace $\tau$ in FIG. 4 discussed above, we can now show that any feasible $\mathcal{F}$ including $\tau$ also includes many more other traces. For example, the trace 1-6-7-8'-9 with 8' the event read(t2, y, 0) that was not allowed before is allowed now as feasible, and so is the trace 1-6-7-8'-9-2-3-10, which shows a race on x by events 3 and 10. Note that there is no way to infer a trace in $\mathcal{F}$ that brings events 4 and 8 (race on y) or 12 and 15 (race on z) next to each other, because that would violate the lock-mutual exclusion or must happen-before consistency.

We have made two assumptions and adopted a deliberate limitation in our feasibility axioms above. First, we assumed that the branch events and the data values in write events depend only on the previous read events by the same thread. If there are other factors that determine these events in a particular language, such as random jumps or expressions, then one either needs to generate additional read events corresponding to those external factors or alternatively to explicitly consider them as special events and modify the axioms accordingly. Second, we assumed that all possible places where the control dependence may be changed are logged as explicit branch events, e.g., mutable pointer dereferences and array indexing. If there are implicit control flow points in a particular program that are activated by the data flow, such as an exception thrown when a division by zero is performed, then one needs to generate additional branch events after each such implicit control choice. Third, we conservatively assumed that each branch or write depends on all the previous read events by the same thread. In most cases branch and write events only depend on the values read within the evaluation of a particular expression. We could get even weaker axioms if we assumed a preceding window of events for each write and branch in which the read values matter for these events, but that would involve more complex events and axioms.

Sound and Maximal Causal Model

Our objective here is to associate to any given consistent trace $\tau$ a sound and maximal causal model, feasible($\tau$), including precisely all the traces that can be generated by any program that can generate $\tau$. It is irrelevant at this stage how we represent such a model; in the next section, we show a way to represent it by means of logical constraints. Soundness means that any program P that can produce $\tau$ can also produce any of the traces of feasible($\tau$). Maximality means that for any trace $\tau'$ that is not infeasible($\tau$) there is some program $\mathcal{P}$ which can produce $\tau$ but not $\tau'$.

Following T. F. Serbanuta et al. (there without control flow), a natural choice for feasible($\tau$) would be the smallest set of traces that includes $\tau$ and is closed under the feasibility axioms. However, that simplistic approach does not work here, mainly because of the local write determinism axiom previously discussed: it would be unsound to pick any particular value v in the write event, because we have no further information about the program that generated the original trace $\tau$ and thus it is impossible to know how it computes the written value. To avoid picking any particular value v, we instead modify the second case of the local data-abstract determinism axiom to introduce (fresh) symbolic values. We keep all the other axioms unchanged, but note that traces appearing in feasible($\tau$) can contain symbolic values in their read and write events. For that reason, we call the new local determinism axioms local symbolic determinism. We use the symbolic axiom variant only to define our maximal causal model; for abstractions of programs $\mathcal{P}$ as their sets of traces we continue to use the non-symbolic axiom variant introduced previously. For clarity, below we give the formal definition of feasible($\tau$).

Let Sym be an infinite set of symbolic values. For technical reasons, we assume that given any trace $\tau$, we can always pick an arbitrary but fixed symbolic value $sym_\tau$ which is distinct from any other similar symbolic value: if $\tau_1 \neq \tau_2$ then $sym_{\tau_1} \neq sym_{\tau_2}$.

DEFINITION 2. Given a consistent trace $\tau$, let feasible($\tau$) be the feasibility closure of $\tau$ defined as the smallest set of (symbolic) traces that includes t and is closed under the following operations:

Prefixes. if $\tau_1\tau_2 \in$ feasible($\tau$) then $\tau_1 \in$ feasible($\tau$).

Local symbolic determinism. Assume that $\tau_1 e_1$, $\tau_2 \in$ feasible($\tau$), that thread($e_1$)=t, and that $\tau_1 \upharpoonright_t \approx \tau_2 \upharpoonright_t$. Then:

a. Branch. If op($e_1$)=branch and $\tau_1 \upharpoonright_{t,read} = \tau_2 \upharpoonright_{t,read}$ then $\tau_2 e_1 \in$ feasible($\tau$).

b. Read. If op($e_1$)=read and $e_2$ is such that $e_2$ [data($e_1$)/data]=$e_1$ and $\tau_2 e_2$ is consistent, then $\tau_2 e_2 \in$ feasible($\tau$).

c. Write. Suppose that op($e_1$)=write. There are two cases to distinguish: if $\tau_1 \upharpoonright_{t,read} \neq \tau_2 \upharpoonright_{t,read}$ then $\tau_2 e_1[sym_{\tau_2}/data] \in$ feasible($\tau$); if $\tau_1 \upharpoonright_{t,read} = \tau_2 \upharpoonright_{t,read}$ then $\tau_2 e_1 \in$ feasible($\tau$).

d. Other. If op($e_1$)/$\in$\{branch, read, write\} and $\tau_2 e_1$ is consistent, then $\tau_2 e_1 \in$ feasible($\tau$).

A trace infeasible($\tau$) is called $\tau$-feasible.

It can be seen that for any mapping $\theta$ of symbolic values to concrete values, $\theta$(feasible($\tau$)) is a feasible set of traces, in the sense of Definition 1. Recall that we abstract multithreaded programs as feasible sets of traces, namely all complete or incomplete traces that the programs can produce when executed. We can think of feasible($\tau$) as an abstract representation of all causal dependencies revealed by $\tau$ in all programs that can produce $\tau$ when executed, each $\theta$ corresponding to such a program. This intuition will be formally captured below, by our soundness and maximality results.

The next result states the soundness of our causal model:

THEOREM 1 (Soundness). Suppose that $\mathcal{F}$ is a feasible set of (concrete) traces, like in Definition 1, and that $\tau \in \mathcal{F}$ is a consistent trace. Then there exists a mapping $\theta$ of symbolic values into concrete values such that $\theta$(feasible($\tau$)) $\subseteq \mathcal{F}$.

PROOF: Since feasible($\tau$) is the smallest set of traces closed under prefixes and the local symbolic determinism axioms in Definition 2, we can order the traces in feasible($\tau$), say $\tau^0=\tau$, $\tau^1, \ldots, \tau^n, \ldots$ for n$\in$N, so that each trace $\tau^{n+1}$ can be derived from one (if a prefix) or from two (if a locally deterministic continuation) of the traces $\tau^0, \tau^1, \ldots, \tau^n$. We construct by induction on n a sequence of partial mappings $\theta_0 = \bot \sqsubseteq \theta_1 \sqsubseteq \theta_2 \sqsubseteq \ldots \sqsubseteq \theta_n \sqsubseteq \ldots$ taking symbolic to concrete values, where $f \sqsubseteq g$ iff Dom(f)$\subseteq$Dom(g) and f(s)=g(s) for each s$\in$Dom(f), such that $\theta_n(\tau^n) \in \mathcal{F}$ for all n$\in$N. Note that $\theta_i(\tau^j)=\theta_j(\tau^j)$ for any i$\leq$j. Then the result immediately holds, because we can take $\theta$ to be the least upper bound (lub) of the chain of these partial functions, $\sqcup_{n \in N} \theta_n$.

If n=0 then we pick $\theta_0 = \bot$; since $\tau^0 = \tau \in \mathcal{F}$ is a concrete trace, $\theta_0(\tau^0) = \tau^0 \in \mathcal{F}$. Now suppose that the desired property holds for all indexes less than or equal to n, and let us prove it for n+1. If $\tau^{n+1}$ is derived as a prefix of some $\tau' \in \{\tau^0, \tau^1, \ldots, \tau^n\}$, then let $\theta_{n+1}$ be $\theta_n$. By the induction hypothesis, $\theta_n(\tau') \in \mathcal{F}$, so $\theta_{n+1}(\tau^{n+1}) = \theta_n(\tau^{n+1}) \in \mathcal{F}$ because $\mathcal{F}$ is prefix closed (Definition 1). If $\tau^{n+1}$ is derived using a local symbolic determinism axiom, there exists two traces $\tau_1 e_1, \tau_2 \in \{\tau^0, \tau^1, \ldots, \tau^n\}$) such that $\tau_1 \upharpoonright_t \approx \tau_2 \upharpoonright_t$, where t=thread($e_1$). By the induction hypothesis, $\theta_n(\tau_1 e_1)$, $\theta_n(\tau_2) \in \mathcal{F}$. Note also that $\theta_n(\tau_1) \upharpoonright_t \approx \theta_n(\tau_2) \upharpoonright_t$. If op($e_1$)=branch then it follows that $\tau_1 \upharpoonright_{t,read} = \tau_2 \upharpoonright_{t,read}$, so $\theta_n(\tau_1) \upharpoonright_{t,read} = \theta_n(\tau_2) \upharpoonright_{t,read}$, and that $\tau^{n+1} = \tau_2 e_1$. Let $\theta_{n+1}$ be $\theta_n$. Then $\theta_{n+1}(\tau^{n+1}) = \theta_n(\tau_2) e_1 \in \mathcal{F}$ because of the local branch determinism of $\mathcal{F}$ (Definition 1).

If op($e_1$)=read then there is some event $e_2$ such that $e_2$ [data($e_1$)/data]=$e_1$, so $\theta_n(e_2)$[data($\theta_n(e_1)$)/data]=$\theta_n(e_1)$, $\tau_2 e_2$ is consistent, so $\theta_n(\tau_2)\theta_n(e_2)$ is consistent, and $\tau^{n+1}=\tau_2 e_2$. Let $\theta_{n+1}$ be $\theta_n$. Then $\theta_{n+1}(\tau^{n+1}) = \theta_n(\tau_2)\theta_n(e_2) \in \mathcal{F}$ because of the local read determinism of $\mathcal{F}$. Now suppose that op($e_1$)=write. There are two cases to distinguish. If $\tau_1 \upharpoonright_{t,read} = \tau_2 \upharpoonright_{t,read}$ then it follows that $\tau^{n+1} = \tau_2 e_1$. In this case we let $\theta_{n+1}$ be $\theta_n$ and $\theta_{n+1} \in \mathcal{F}$ follows similarly to the previous cases. If $\tau_1 \upharpoonright_{t,read} \neq \tau_2 \upharpoonright_{t,read}$ then it follows that $\tau^{n+1} = \tau_2\ e_1$ [$sym_{\tau_2}$/data]. By the local write determinism of $\mathcal{F}$ (Definition 1), there is some value v such that $\theta_n(\tau_2)\theta_n(e_1)$[v/data]$\in \mathcal{F}$. In this case we pick $\theta_{n+1}$ to be equal to $\theta_n$ in all symbolic values in which $\theta_n$ is defined, and $\theta_{n+1}(sym_{\tau_2})$=v. Note that $\theta_{n+1}$ is well defined because of our assumption that $sym_{\tau_2}$ is uniquely determined by $\tau_2$. Finally, if op($e_1$)$\notin$\{branch, read, write\} then it follows that $\tau_2 e_1$ is consistent, so $\theta_n(\tau_2)\theta_n(e_1)$ is consistent, and that $\tau^{n+1}=\tau_2 e_1$. In this case we can again let $\theta_{n+1}$ be $\theta_n$. Then $\theta_{n+1}(\tau^{n+1})=\theta_n(\tau_2)\theta_n(e_1) \in \mathcal{F}$ also by the feasibility of $\mathcal{F}$.

In words, the soundness theorem says that if a hypothetical program $\mathcal{P}$ (abstracted above by the complete or incomplete traces in $\mathcal{F}$ that it can produce) generates a trace $\tau$, then any $\tau$-feasible trace, which may contain symbolic data values, corresponds to some concrete trace $\tau'$ that $\mathcal{P}$ can also generate, obtained by instantiating the symbolic values with some concrete ones. Therefore, if a dynamic error detection technique is based on our maximal causal model, say a data race detector, then any error reported by the technique is a real error, which can happen under a different thread schedule.

The next result states the maximality of our sound causal model:

THEOREM 2 (Maximality). Suppose that $\tau, \tau'$ are concrete traces such that $\tau$ is consistent and $\tau' \notin \theta$ (feasible($\tau$)) for any $\theta$ mapping symbolic values to concrete values. Then there is a multithreaded program $\mathcal{P}$ with $\tau \in$ feasible($\mathcal{P}$) and $\tau' \notin$ feasible($\mathcal{P}$).

PROOF: To refer to programs and their execution traces, we formally define a programming language that can produce all the events that we consider in our traces, noting that other events can similarly be supported and that this language is sufficiently basic that its instructions can be reproduced in any other programming language. The formal definition of the language is then used to show that the set of traces that any program $\mathcal{P}$ can produce when executed, feasible($\mathcal{P}$), is indeed a feasible set in the sense of Definition 1. Finally, given a consistent trace $\tau$ we construct a program $\mathcal{P}_\tau$ such that feasible($P_\tau$)$\subseteq \cup_\theta \theta$(feasible($\tau$)).

For brevity, we here describe the language and its semantics informally. The language has threads that can be forked and joined, (non-reentrant) locks that can be acquired and released, and both shared and thread-local variables. Shared variables can only be read and written with simple assignments r:=x and x:=r, respectively, where r is a local and x is shared. The trace semantics of the language is that all statements of the language produce corresponding events when executed, except for reads and writes of local variables. Complex assignments of the form r:=$(r_1==v_1)$&& ... &&$(r_n==v_n)$?v:v' are also allowed, where r, r1, ..., $r_n$ are locals and $v_1, \ldots, v_n$, v, v' are values, with the meaning that if $r_i$ equals $v_i$ for all $1 \le i \le n$ then r takes the value v, otherwise v'. However, these generate no events. Finally, we also introduce a simple conditional statement to account for branch events: if(r). Corresponding semantics include that the statement produces a branch event and the execution continues only if local variable r is 1; otherwise the execution gets stuck without a branch event. Using the language semantics, it is relatively straight forward (albeit tedious) to define the set feasible($\mathcal{P}$) of all complete or incomplete traces of a program $\mathcal{P}$, and to show that it satisfies the feasibility axioms in Definition 1.

The only thing left is to construct a particular program, from a consistent trace $\tau$ such that feasible($\mathcal{P}_\tau$) $\subseteq \cup_\theta \theta$(feasible($\tau$)), where the union goes over all mappings $\theta$ from symbolic to concrete values. The idea is to traverse the trace $\tau$ and generate the program $\mathcal{P}_\tau$ by replacing each event in $\tau$ with one or more corresponding instructions in $\mathcal{P}_\tau$. We discuss the read, write and branch events last. Each fork(t1, t2) event generates a corresponding fork statement in thread t1, making sure that all subsequent events of thread t2 are used to generate instructions in the forked thread. Similarly, each join(t1, t2) event generates a corresponding join statement in thread t1. Events acquire(t, l) and release(t, l) generate corresponding acquire and release instructions of lock l in thread t, and similarly for wait/notify events. The interesting events are the reads, writes and branches. For each event read(t, x, v), we generate an assignment statement r:=x, where r is a fresh local variable that we keep track of in the generation algorithm that it is paired with value v. For each event write(t, x, v) we generate two instructions in thread t, r:=$(r_1==v_1)$&& ... &&$(r_n==v_n)$?v:v' x:=r where $(r_1,v_1), \ldots, (r_n,v_n)$ are all the pairs between a local variable and a value corresponding to read events as above that the generation algorithm stored for thread t so far, and where v' is a value distinct from v. Finally, for events branch(t) we generate the following instructions in thread t:

r:=$(t_1==v_1)$&& ... &&$(r_n==v_n)$?1:0 if(r).

In both cases above, the complex assignment ensures that r gets the expected value only if the thread's read history is the same as that in the original trace $\tau$. In the case of write, if that is the case then the precise value v that appeared in $\tau$ is written, which accounts for the first case of the local write determinism axiom before Definition 1. Otherwise, a different value v is written, which accounts for the second case of the local write determinism axiom. We need not worry about which particular value v' should be written to avoid having $\tau'$ as a possible trace, because $\tau' \notin \theta$(feasible($\tau$)) for any $\theta$ guarantees that no v' has this property. In the case of branch, the thread is allowed to continue only if its read history is identical to that of $\tau$; otherwise the thread gets stuck without issuing a branch event. This accounts for the local branch determinism axiom.

The generated program $\mathcal{P}_\tau$ is therefore straightforward, its instructions corresponding almost identically to the trace $\tau$ and having no loops; in fact, our language is not even Turing-complete. Using the language semantics we can show that $\tau \in$ feasible($\mathcal{P}_\tau$), and also that any trace $\tau'$infeasible($\mathcal{P}_\tau$) is included in $\theta$(feasible($\tau$)) for some mapping $\theta$ of symbolic to concrete values; specifically, it is a $\theta$ that maps symbolic values $sym_{\tau_2}$ introduced by the second case of the local write determinism of the feasibility closure (see Definition 2) to (arbitrarily chosen) concrete values v' as in the corresponding instructions associated to the write event. Therefore, feasible($\mathcal{P}_\tau$)$\subseteq \cup_\theta \theta$(feasible($\tau$)), so $\mathcal{P}_\tau$ is such a multithreaded program P with $\tau \in$feasible($\mathcal{P}$) and $\tau' \notin$feasible($\mathcal{P}$).

Specifically, the maximality theorem says that for any concrete trace $\tau$ which is not an instance of a (possibly symbolic) $\tau$-feasible trace, there exists a "witness" program $\mathcal{P}$ that can produce $\tau$ but not $\tau'$. Therefore, any dynamic error detection technique that produces counterexample traces that are not instances of $\tau$-feasible traces are considered to be unsound: there are programs for which technique reports false alarms. The disclosed soundness and maximality results are intrinsically based on the assumption that the traces generated by multithreaded programs obey the disclosed feasibility axioms for sequential consistency, and the statements of the target multithreaded programming language have the granularity of our events.

Maximal Causal Properties

The existence of a maximal causal model allows us to define maximal variants of concurrency properties, such as races, atomicity, etc. While we focus on races for exemplary purposes, the proposed maximal causal model applies to any thread properties the violation of which could be considered a concurrency bug.

DEFINITION 3 (COP). Events a and b form a conflicting operation pair, written COP(a,b), if op(a)=write, op(b) $\in$ {write, read}, target(a)=target(b), and thread(a)$\ne$thread(b).

DEFINITION 4 (Data race). Consistent trace $\tau$ has a race if there is a consistent trace $\tau_1 ab \in$feasible($\tau$) such that COP(a, b)[2].

Consider again the trace $\tau$ in FIG. 4. There are three conflicting pairs: COP(3, 10), COP(4, 8), and COP(12, 15). However, only COP(3, 10) is a race because, as previously discussed, there is a consistent trace 1-6-7-8'-9-2-3-10$\in$feasible($\tau$), with 8'=read(t2, y, 0), in which event 3 is immediately before 10, and there is no way to bring events 4 and 8 (race on y) or 12 and 15 (race on z) next to each other without breaking consistency.

Theorem 1 implies that our notion of a race above is sound, so any dynamic race detection technique reporting only races among those in Definition 4 is sound, e.g., there are no false alarms. However, the key feature of our definition of a race is its maximality: the witness of the race in $\tau$ is a (possibly symbolic) trace $\tau'$ that belongs to the maximal causal model of $\tau$. Note that the symbolicity of $\tau'$ is irrelevant for races. Therefore, any sound (not necessarily maximal) dynamic race detection technique can detect no races that are not captured by Definition 4. A technique that can detect precisely all the races in Definition 4, like the technique presented shortly in the below section, is therefore both sound and maximal.

Maximal Dynamic Race Detection

This section presents our technique for maximal dynamic race detection. We first give an illustrative technical overview, followed by the formal modeling of our technique based on the maximal causal model foundation presented in Section 2.

Technical Overview Summary

Given an input trace $\tau$, the goal of dynamic race detection is to find a $\tau$-feasible trace $\tau'$ and a COP(a, b) such that a and b are next to each other in $\tau'$ (Definition 4). Since here we analyze race detection, where the particular values written or read by events are irrelevant, to simplify the present explanation, we make no distinction between an event that appears in $\tau$ and its data-abstractly equivalent variants appearing in $\tau$-feasible traces. We formulate the maximal race detection problem as a constraint-solving problem. Specifically, we introduce an order variable $O_e$ for each event e in $\tau$, which represents the order of e in $\tau'$. Then we generate a formula $\Phi$ over these variables corresponding to the race problem for $\tau$ and COP(a, b), e.g., one that is satisfiable if $O_b - O_a = 1$ for some $\tau' \in \text{feasible}(\tau)$. By solving $\Phi$ using any constraint solver, we are able to determine whether (a, b) is a race or not.

For concreteness, we only consider the common concurrent objects that yield the event types in FIG. 3, whose serial specifications generate the consistency requirements previously discussed. FIG. 5 shows our constraint modeling of the example trace in FIG. 4. Let $O_i$ refer to the order variable of the event at line i. The constraints consist of three parts: (A) the must happen-before (MHB) constraints, (B) the locking constraints, and (C) the race constraints. A and B are common for all races, whereas C is race specific. For example, the MHB constraints for the fork event at line 1 and the join event at line 14 are written as $O_1 < O_6 \wedge O_{14} > O_{13}$, meaning that the fork event should happen before the begin event of t2 at line 6, and the join event should happen after the end event of t2 at line 13, which are determined by the must happen-before consistency requirement.

The locking constraints encode lock mutual exclusion consistency over acquire and release events. For example, $O_5 < O_7 \vee O_9 < O_2$ means that either t1 acquires the lock 1 first and t2 second, or t2 acquires 1 first and t1 second. If t1 first, then the acquire at line 7 must happen after the release at line 5; otherwise if t2 first, the acquire at line 2 should happen after the release at line 9.

The race constraints encode the race and control flow conditions specific to each COP. For example, for the COP (3,10), the race constraint is written as $O_{10} - O_3 = 1$, and its control-flow condition is empty, because there is no branch event before the two events at lines 3 and 10. For (12,15), however, because there is a branch event (at line 11) before line 12, in addition to the race constraint $O_{15} - O_{12} = 1$, we need to ensure that the control-flow condition at the branch event is satisfied. To respect the local branch determinism axiom, we can require that all read events by t2 before this branch event read the same value as that in the original trace. Hence, we can add the control-flow constraints $O_3 < O_{10} \wedge O_4 < O_8$ to ensure that the read event at line 10 reads value 1 on x, and that the read event at line 8 reads value 1 on y. This guarantees that the event at line 12 is feasible.

Putting all these constraints together, we invoke an SMT solver, such as Z3 or Yices in our current implementation, to compute a solution for these unknown order variables. For (3,10), the solver returns a solution that corresponds to the schedule 1-6-7-8-9-2-3-10, so (3,10) is a race. For (12,15), the solver reports no solution exists, so it is not a race.

Constraint Modeling

As mentioned, given an observed trace $\tau$, we encode the maximal race detection problem as a formula $\Phi$ specifying all the $\tau$-feasible traces with respect to each race. The formula $\Phi$ contains only variables of the form $O_e$ corresponding to events e, which denote the order of the events in the to-be-computed $\tau$-feasible trace (if there exists one) that can manifest the race. Although we define a race of $\tau$ as a property over the maximal causal model feasible($\tau$) (Definition 4), for performance reasons we purposely do not follow the same approach here when generating the constraints. That is because the characterizing formula of feasible($\tau$) would be unnecessarily complex for the bare task of detecting races, e.g., it would need to generate constraints for all branches, not only for those immediately guarding the events in a COP, and to account for the fact that the constraints corresponding to events following an invalidated branch do not influence the overall formula satisfiability. Thus, $\Phi$ is constructed by a conjunction of three sub-formulae:

$$\Phi = \Phi_{mhb} \wedge \Phi_{lock} \wedge \Phi_{race}.$$

MHB Constraints ($\Phi_{mhb}$): The must happen-before (MHB) consistency requirements previously discussed cover all the trace consistency requirements except for those of the read/write and acquire/release events (which we treat differently). MHB, together with the total orders of the events in each thread, yield an obvious partial order < on the events of $\tau$ that must be respected by any $\tau$-feasible trace. Fortunately, < can be specified as constraints over the O variables: we start with $\Phi_{mhb} \equiv \text{true}$ and conjunct it with a constraint $O_{e_1} < O_{e_2}$ whenever $e_1$ and $e_2$ are events by the same thread and $e_1$ occurs before $e_2$, or when $e_1$ is an event of the form fork(t, t') and $e_2$ of the form begin(t'), etc. We assume a background first-order theory where < is transitive, like in Z3 and Yices, so we do not need to encode the transitivity of <. The size of $\Phi_{mhb}$ is linear in the length of $\tau$.

Note that our MHB differs from Lamport's happens-before in two aspects: (1) read and write events by different threads are not included, because their order may be consistently commutable; (2) acquire and release events are not included, because the order between different lock regions may also be consistently commutable.

Locking Constraints ($\Phi_{lock}$): Lock mutual exclusion consistency means that two sequences of events protected by the same lock do not interleave. $\Phi_{lock}$ captures the ordering constraints over the lock acquire and release events. For each lock l, we extract the set $S_l$ of all the corresponding pairs (a, i) of acquire/release events on l, following the program order locking semantics: the release is paired with the most recent acquire on the same lock by the same thread. Then we conjunct $\Phi_{lock}$ with the formula $$\bigwedge_{(a,r),(a',r') \in S_l} (O_r < O_{a'} \vee O_{r'} < O_a),$$

which is quadratic in the number acquire/release events on l in $\tau$.

Race Constraints ($\Phi_{race}$): For a COP(a, b), $\Phi_{race}$ contains two categories of constraints: the arithmetic constraint $O_b - O_a = 1$ that specifies the race condition, and a conjunction of two control-flow constraints $\Phi^\sim_{cf}(a) \wedge \Phi^\sim_{cf}(b)$ specifying the data-abstract feasibility of a and b. We next define $\Phi^{\approx}_{cf}(e)$ for any read/write event e.

Recall the local determinism axioms that the events appearing in τ-feasible traces follow a deterministic order when projected on their thread, but the data values in read and write events are allowed to be different from those in τ, in order to satisfy the read consistency requirement of the τ-feasible trace. Making abstraction of the particular data values in read/write events, the only factor that can affect the feasibility of such an event e, in addition to the MHB and lock consistency requirements which are already encoded as detailed above, is that some event e' that must happen before e, e.g., e'<e, is infeasible because of a previous branch by the same thread that is infeasible. Because of the local branch determinism axiom, the feasibility of a branch is determined by the complete read history of its thread, so we only need to consider the feasibility of the last branch event of each thread that must happen before e. Let $B_e$ be the set of last branch events e' of each thread with e'<e. Then let $$\Phi^{\approx}_{cf}(e) = \bigwedge_{e' \in B_e} \Phi_{cf}(e'),$$

$$op(e) \in \{\text{read, write}\}$$

be the formula stating that the data-abstract feasibility of a read or write event e reduces to the feasibility of all the branch events in $B_e$. We next model the concrete feasibility of any read, write, or branch event e as a formula $\Phi_{cf}(e)$, where "concrete" means that e appears unchanged, including its data value, in the τ-feasible trace.

According to the local branch and write determinism axioms, the concrete feasibility of branch and write events is determined by the complete read history of their thread, that is, $$\Phi_{cf}(e) = \bigwedge_{r \in \tau e \upharpoonright_{t,read}} \Phi_{cf}(r),\ op(e) \in \{\text{branch, write}\},\ t = \text{thread}(e).$$

So far, we have encoded the axioms of the disclosed maximal causal model using constraints. The part that does not follow explicitly from the axioms is how to encode the concrete feasibility of read events (needed in formula above). We need to ensure that a read(t, x, v) event reads the same value v written by a concretely feasible write(_, x, v) event ("_" means any thread). Specifically, if for a read event r, say read(t, x, v), we let $W^r$ be the set of write(_,x,_) events in τ, and $W_v^r$ the set of write(_, x, v) events in τ, then we define the following:

$$\Phi_{cf}(r) = \bigvee_{w \in W_v^r} \left( \Phi_{cf}(w) \wedge O_w < O_r \wedge \bigwedge_{w \ne w' \in W^r} (O_{w'} < O_w \vee O_r < O_{w'}) \right).$$

The above states that the read event r=read(t, x, v) may read the value v on x written by any write event w=write(_, x, v) in $W_v^r$ (the top disjunction), subject to the condition that the order of w is smaller than that of r and there is no interfering write(_, x,_) in between. Moreover, w itself is concretely feasible, which is ensured by $\Phi_{cf}(w)$.

The size of $\Phi_{cf}$ in the worst case, is cubic in the number of read and write events in τ. Nevertheless, in practice, the size of $\Phi_{cf}$ can be significantly reduced by taking < into consideration. Consider two write events $w_1$ and $w_2$ in $W_v^r$. If $w_1 < w_2 < r$, we can exclude $w_1$ from $W_v^r$ because r cannot read the value written by $w_1$ due to the read consistency axiom. Similarly, for any $w' \in W^r$, if $r < w'$, then w' can be excluded from $W^r$. Also, when constructing the constraints for matching an event $w \in W_v^r$ to r, if $w' < w$, then w' can be skipped.

Soundness and Maximality

Our race detection technique above is sound and maximal. Soundness means every detected race is real. Maximality means that our technique does not miss any race that can be detected by any sound dynamic race detector based on the same trace.

It suffices to prove the following:

THEOREM 3 (Soundness and maximality). If Φ is the first-order constraint associated to a given trace τ as above, then Φ is satisfiable iff (a, b) is a race in τ in the maximal sense of Definition 4.

PROOF: Suppose that $\tau = e_1 e_2 \ldots e_n$. Note that $\rho \models \Phi$ for some $\rho: \{O_{e_1}, O_{e_2}, \ldots, O_{e_n}\} \to \mathbb{N}$ iff $\rho' \models \Phi$ for a bijective $\rho': \{O_{e_1}, O_{e_2}, \ldots, O_{e_n}\} \to \{1, 2, \ldots, n\}$. That is because the particular values assigned to the O variables are irrelevant, except for the race constraint $O_b - O_a = 1$, so we can find an ordering of $\rho(e_1), \rho(e_2), \ldots \rho(e_n)$ such that $\rho(a)$ is followed by $\rho(b)$. Therefore, from here on we can only consider valuations of the form $\rho: \{O_{e_1}, O_{e_2}, \ldots, O_{e_n}\} \to \{1, 2, \ldots, n\}$. Any $\rho$ yields the permutation $e_{\rho(O_1)} e_{\rho(O_2)} \ldots e_{\rho(O_n)}$ of τ, which we write [ρ].

Accordingly, one can see that $\rho \models \Phi_{mhb}$ iff [ρ] satisfies the must happen-before consistency requirements, and that $\rho \models \Phi_{lock}$ iff [ρ] satisfies the lock mutual exclusion requirements. We can also show by induction on i that for any event $e_i$ of τ with $op(e_i) \in \{\text{branch, read, write}\}$ and $t = \text{thread}(e_i)$, it is the case that $\rho \models \Phi_{cf}(e_i)$ iff $[\rho]_{e_i} \upharpoonright_{t,read} = \tau_{e_i} \upharpoonright_{t,read}$ and any read event in these trace projections satisfies the read consistency requirement in $[\rho]_{e_i}$: for branch and write events, the definition of $\Phi_{cf}$ reduces the property to previous read events, and for read events the definition of $\Phi_{cf}$ reduces the property to previous write events.

Let us first prove the soundness, that is, that if Φ is satisfiable then (a, b) is a race in τ. Let $\rho \models \Phi$. Then by the properties above and the definitions of $\Phi^{\approx}_{cf}$ and of $\Phi_{cf}$, the following hold: [ρ] satisfies the must happen-before and lock mutual exclusion consistency requirements; $[\rho]_b = [\rho]_a$ b; and for all $e' \in B_a$, if $t = \text{thread}(e')$ then $[\rho]_{e'} \upharpoonright_{t,read} = \tau_{e'} \upharpoonright_{t,read}$. We can then inductively build a trace $\tau_1$ over data-abstract variants of the events in the set $\{e | e < a\}$, traversing the variants in the order in which the events occur in [ρ]. More specifically, where e is the next such event: if e is not a read or a write then append it to $\tau_1$. If e is a read, then to ensure read consistency, we need to possibly change its value to the value written by the last event in $\tau_1$ so far, and then append e to $\tau_1$. If e is a write event then (1) if $\rho \models \Phi_{cf}(e)$ then append e to $\tau_1$; otherwise, (2) change the value of e to the symbolic value $\text{sym}_{\tau_1}$ and then append it to $\tau_1$. All the steps above preserve the consistency of $\tau_1$ and accord with the local determinism axioms characterizing feasible(τ), so we can deduce that $\tau_1 \in \text{feasible}(\tau)$. We can now extend $\tau_1$ with (possibly data-abstract variants of) a and b similarly to the above, and thus obtain that $\tau_1 ab \in \text{feasible}(\tau)$, so (a, b) is a race in τ.

Let us now show the maximality, that is, that if (a, b) is a race in τ then Φ is satisfiable. Let $\tau_1 ab \in \text{feasible}(\tau)$ and let $\tau_2$ be the trace formed with the remaining elements of τ, in the order in which events appeared in τ. Although the trace $\tau' = \tau_1 ab \tau_2$ may not be τ-feasible, it still respects the must-happen before and lock mutual exclusion consistency requirements. Let $\rho$ be the valuation with $[\rho]=\tau'$. Then clearly $\rho \models \Phi_{mhb} \wedge \Phi_{lock} \wedge O_b - O_a = 1$. Since $\tau_1$ ab is $\tau$-feasible, prefix closedness ensures that $[\rho]_e$ is also $\tau$-feasible for each branch event $e' \in B_a$. The local branch determinism axiom then implies that $[\rho]_e.t_{t,read} = \tau_e.t_{t,read}$, so by the property above and the definition of $\Phi^\sim_{cf}$ we conclude that $\rho \models \Phi^\sim_{cf}(a)$. We can similarly show $\rho \models \Phi^\sim_{cf}(b)$, so $\rho \models \Phi$.

Implementation

We have implemented our technique in RV-Predict, a runtime predictive analysis system for Java. Although the Java memory model (JMM) is not sequentially consistent, it does not affect the soundness of our implementation, as any race in a sequential consistency model should also be a race in JMM. To properly model the Java language constructs (i.e., to ensure that the Java execution conforms to our model), we make the following treatments in our implementation:

Branch: The branch events include not only explicit control flow statements, but also implicit data flow points that can affect the control flow. For example, both shared pointer dereferences (e.g., calling a method of a shared object) and array-indexing statements (e.g., read/write to an array with a non-constant index) are considered as additional branch events.

Consider the program shown in FIG. 6 executed following the order of line numbers. Lines 2 and 7 are unordered and they both access a[0]. However, (2,7) is not a race, because if line 2 is scheduled next to line 7, line 2 will access a[1] instead of a[0]. Hence, we must ensure the same implicit data flow for array accesses.

Wait-Notify: Java's wait( ) and notify( )/notifyAll( ) are usually not discussed in previous studies. In our implementation, we treat wait( ) as two consecutive release-acquire events, notifyAll( ) as multiple notify( ) where the number is equal to the number of currently waiting threads on the same signal, and keep a mapping from wait( ) to its corresponding notify( ) in the original execution. In the constraint, we ensure the order of the notify( ) is between that of the two consecutive release-acquire events of the corresponding wait( ), but not between that of any other wait( ) on the same signal (to ensure that the notify( ) is matched with the same wait( ) as that in the original execution). Currently, we do not model spurious wakeups and lost notifications in our implementation. However, since spurious wakeups and lost notifications rarely happen in practice, this does not limit the usability of RV-Predict.

Re-entrant Locking: To simplify the constraint, re-entrant lock acquire/release events are filtered out dynamically in the execution, e.g., discarding all but the outermost pair of acquire/release events on the same lock.

Volatile Variables: As concurrent conflicting accesses to volatile variables are not data races in Java, we do not report them.

RV-Predict consists of two main phases: trace collection and predictive race analysis. In trace collection, we log a sequentially consistent trace of shared data accesses, thread synchronizations, and branch events. To support long running programs, traces are first stored event by event into a database. Note that trace collection can be performed at various levels, e.g., via static or dynamic code instrumentation, inside the virtual machine (VM), or at the hardware level. As trace collection is not our main concern here, our implementation is based on static instrumentation and is not optimized. Nevertheless, ideally, we can use hardware tracing techniques to minimize the runtime perturbation. In predictive race analysis, we first use a hybrid lockset and weaker HB algorithm (similar to PECAN) to perform a quick check on each conflicting operation pair (COP). Only after a COP passes the quick check do we proceed to build constraints for the COP.

To optimize the constraint solving, instead of adding a conjunction $O_b - O_a = 1$ for each COP(a, b), we simply replace $O_a$ by $O_b$ in the constraints. In this way, all constraints become simple ordering comparisons over integer variables, which can be solved efficiently using the Integer Difference Logic (IDL) (provided in both Z3 and Yices). We set the default constraint solving time to one minute for each COP. If the solver returns a solution within one minute, we report a race. In addition, to avoid redundant computation on races that have the same signature (from the same program locations), once a COP is reported as a race, we prune away all the other COPs with the same signature with no further analysis.

Handling Long Traces: From an engineering perspective, handling long traces is challenging for any race detection technique. For real world applications, the trace is often too large to fit into the main memory. Moreover, for our approach, the generated constraints for long traces can be difficult to solve. Even with a high performance solver like Z3 or Yices, the constraints may still be too heavy to solve in a reasonable time budget. For practicality, we employ in RV-Predict a windowing strategy similar to CP. We divide the trace into a sequence of fixed-size windows (typically 10K events in a window) and perform race analysis on each window separately. This simple strategy has two advantages for performance optimization. First, each time only a window size of events is processed, which can be loaded in memory. Second, the generated constraints for a window instead of the whole trace become much smaller, so that Z3 and Yices can solve them much easier. The downside of this strategy is that a race between operations in different windows will not be detected. Fortunately, because the likelihood for two operations to race dramatically decreases when the distance between them gets larger, we did not find many such cases in practice. Moreover, this windowing strategy does not affect the soundness of our implementation. All detected races by RV-Predict are real, e.g., it does not report any false positives.

Evaluation

Our evaluation aims to answer the following research questions:

Race detection capability: How many races can our technique detect in popular benchmarks and real world systems? As our technique is maximal, how many more races can it detect than the other state-of-the-art sound but non-maximal techniques?

Scalability: How efficient is our technique? Can it scale to real world executions? To properly compare our technique with the state-of-the-art, we have also implemented HB, CP, and Said et al. in RV-Predict. We attempted to conduct an unbiased comparison and faithfully implemented the techniques according to their representative publications.

We evaluated these techniques on an extensive collection of widely used multithreaded benchmarks as well as several real world large concurrent systems, mostly from previous studies. To perform a fair comparison, for each benchmark, we collected one trace and ran different techniques on the same trace. To evaluate with long traces, because all techniques (including HB and CP) need the windowing strategy to scale, for all techniques and all benchmarks, we set the window size to 10K. This is sufficient to cover the traces of small benchmarks and at the same time to ensure that for large traces all techniques can finish within a reasonable time.

All experiments were conducted on a 8-core 3.50 GHz Intel i7 machine with 32 G memory and Linux version 3.2.0. The JVM is OpenJDK 1.7.0 64-Bit Server with 32 G heap space. We next discuss our experimental results in detail as reported in the table of FIG. 7.

Benchmarks and Traces: Columns 1-2 list our benchmarks. The total source lines of code of these programs are more than 1.7M. The first row shows our example program in FIG. 1. The second set of small benchmarks is from IBM Contest benchmark suite. The third set contains three popular multithreaded Java Grande benchmarks. The last set contains real world large applications. The most substantial real systems include:

FTPServer—Apache's high-performance FTP server;
Jigsaw—W3C's web server;
Derby—Apache's widely used open source Java RDBMS;
Sunflow, Xalan, Lusearch, Eclipse—popular multithreaded applications from Dacapo benchmark suite 9.12.

Columns 3-7 report metrics of the collected traces. The traces cover a wide range of complexity. The number of events in the traces ranges from hundreds in small benchmarks to as large as 14.8M in real systems. For most real systems, the traces contain more than 10 threads. The number of read/write, synchronization, and branch events is significant in the real systems, ranging between 40K-7.7M, 0.5K-650K, and 200K-6M, respectively. We are not aware of previous sound predictive race detector implementations that have been evaluated on executions with such a large scale.

Bug Detection Capability: Column 8 reports the number of potential races that pass the quick check of a hybrid lockset and weaker HB algorithm. These races comprise a superset of all the real races that can be detected from the trace. Because the hybrid algorithm is unsound, some races in this set may be false positives. For example, there are 18 potential races detected in bufwriter, but only 2 of them are real races. Columns 9-12 report the number of real races detected by different sound techniques.

The results show that, for every benchmark, our technique is able to detect more or at least the same number of races (e.g., a super set) as the other sound techniques. For instance, for derby, our technique (RV) detected 118 races, while Said et al. detected 15, CP detected 14, and CP detected 12. This demonstrates that our technique achieves a higher race detection capability not only theoretically, but also in practice. For Said et al., it detected more races than HB and CP in most benchmarks, with a few exceptions, though. For example, for ftpserver, CP and HB detected 31 and 27 races, respectively, whereas Said et al. only detected 3. The reason for this is that the all read-write consistency prevents Said et al. from detecting races in feasible incomplete traces, though its SMT-based solution is able to explore more valid whole trace re-orderings than CP and HB. Between CP and HB, they detected the same number of races in the small benchmarks. This was because the lock regions in these small benchmarks typically have conflicting accesses. However, this does not hold for the real systems. In ftpserver, derby, and xalan, CP detected a few more races than HB.

For the real systems, our technique detected a total number of 299 real races. Notably, among these races, a number of them are previously unknown. For example, we found three real races in eclipse, one is on the field variable activeSL of class org.eclipse.osgi.framework.internal.core.StartLevelManager, and the other two happen on the field elementCount of class org.eclipse.osgi.framework.util.KeyedHashSet. Interestingly, Keyed-HashSet is documented as thread unsafe. The Eclipse developers misused this class and created a shared instance by multiple threads without external synchronization. Shortly after we reported these races, the developers fixed them and also contacted us for adopting our tool. Now the team is using RV-Predict to detect races in the codebase of Virgo. We also found eight previously unknown races in lusearch, all of which happen in the class org.apache.lucene.queryParser.QueryParserTokenManager. We first reported these races in the lucene bug database. However, the developer pointed out that QueryParserTokenManager is documented as thread unsafe. It turned out that this class was misused by the Dacapo developers in writing the lusearch benchmark.

Note that our technique is sound and fully automatic. Unlike many unsound techniques that report false warnings or even sound techniques that require manual post-processing for most races (e.g., CP), every race detected by our technique is real. This has been supported by our manual inspection: every reported race has been checked and confirmed to be real. On the other hand, because the maximality of our technique is concerned with sound race detection only, it is possible that our technique may miss some real races that can be reported by an unsound race detector. For example, not all the potential races reported in Column 8 are necessarily false alarms if not reported in Column 9 as well. However, if such a race exists, our technique guarantees that it cannot be reported by any sound technique using the same input trace. Note that any dynamic race detection technique (including ours) is sensitive to the observed execution trace. The results reported for different traces are incomparable. Therefore, it is possible for our technique to miss certain races reported in other studies, because the traces in our experiments may be different from those used in other's work.

Scalability: The performance of our technique largely depends on the complexity of the constraints and the speed of the constraint solver, as the core computation of our technique takes place in the constraint-solving phase. With the high performance solvers and our windowing strategy, our technique shows good scalability when dealing with large traces. Column 13 reports the total time for our technique to detect races in each program using Yices. The performance of Z3 was comparable with only slight variances. For most small benchmarks, our technique was able to finish in a few seconds. For most real systems, our technique finished within around a minute. The most time consuming case is derby, which our technique took around 30 minutes to process. The reason is that the trace of derby has a lot more potential races (469 COPs) and also it contains many fine-grained critical sections (38K synchronizations), making the generated constraints much more complex.

Columns 14-16 report the race detection time for the other three techniques. Among the four techniques (including ours), HB and CP are comparable and are typically faster than Said et al. and our technique. This is expected because HB and CP do not rely on SMT solving and explore a much smaller set of trace re-orderings. Between our technique and Said et al., our technique typically has better performance. For example, for the derby trace, Said et al. took more than one hour (timeout) without finishing, while our technique finished within around 30 minutes. The reason is that our technique generates fewer constraints to solve than Said et al. for capturing the read-write consistency. While Said et al. generate constraints for all read events in the trace to ensure the whole trace read-write consistency, our technique concerns only the read events that have control flow to the race events.

GPredict: Generic Predictive Concurrency Analysis

The difficulty of concurrent programming has inspired a wide range of fault detection and diagnosis tools. Among them, predictive trace analysis (PTA) has drawn a significant attention. Generally speaking, a PTA technique has two steps: it first records a trace of execution events at runtime, and then, offline, the PTA technique generates other (often exhaustive) permutations of these events under certain causal model of scheduling constraints, and predicts concurrency faults unseen in the recorded execution. PTA is powerful as, compared to dynamic analysis, PTA is capable of exposing bugs in unexercised executions and, compared to static analysis, PTA incurs much fewer false positives.

We observe that existing PTA techniques are generally limited to detecting low-level memory access errors, such as data races, atomicity violations, atomic-set serialization violations, or deadlocks. While these errors are common, they only capture a small portion of concurrency faults in real world programs. For example, consider a resource authenticate-before-use property, which requires that a method authenticate to be always called before a method that uses a resource. Any violation of this property is considered to be a serious security bug. However, the property cannot be characterized by conventional data races, because in a violation of this property there may not even exist conflicting reads and writes to shared data. As another example, in Java, a collection is not allowed to be modified when an iterator is accessing its elements. This property, again, is neither a data race nor an atomicity violation, but a more generic contract on the use of Java Iterators. Existing techniques do not work for these properties.

Moreover, while existing techniques are effective in detecting the targeted race or atomicity errors, their algorithms are usually ad hoc and are not applicable to such more general properties. For example, the cut-point based algorithm of Francesco Sorrentino, Azadeh Farzan, and P. Madhusudan, Penelope: Weaving threads to expose atomicity violations, in FSE, 2010 ("Penelope") is specialized for predicting atomicity violations, and the pattern-directed graph search algorithm in PECAN detects only concurrency access anomalies. Furthermore, for building the causal model, existing algorithms generally assume as input a linearized trace of events, which contains all the necessary causal ordering information (e.g., happens-before) between critical events (i.e., shared data accesses and synchronizations). However, this relies on the ability to track a globally ordered sequence of events by all threads at runtime, which often incurs hundreds or even thousands of times of program slowdown, making these techniques less useful in practice.

Accordingly, we present a PTA system and method we call "GPredict" that realizes predictive trace analysis for high-level more generic properties. Our central observation is that a vast category of concurrency faults, together with the causal model, can be modeled uniformly as first-order logical constraints between events. For example, for the authenticate-before-use property, suppose we model the calls of these two methods as two events, auth and use, and give each of them a corresponding order variable, $O_{auth}$ and $O_{use}$, respectively. A violation of this property can be modeled by the constraint $O_{use}<O_{auth}$, stating that the property is violated if there exists any feasible schedule in which the order of the use event is smaller than the order of the auth event. Similarly, violations of the collection iterator property can be modeled as $O_{create}<O_{update}<O_{next}$, specifying that the property is violated if a collection update event comes between the iterator create event and an iterator next event. Meanwhile, we can also soundly encode the causal model as constraints over the order of critical events. By solving a conjunction of these constraints, we can determine whether a property can be violated in other feasible executions, hence, to predict faults defined by the properties.

Based on the observation above, we first design a specification language for users to specify generic concurrency property violations. Our language is adapted from MOP (See Feng Chen and Grigore Rosu, MOP: an efficient and generic runtime verification framework, in *OOPSLA*, 2007), a runtime verification system for parametric properties. Similar to MOP, users of GPredict can declare the property events (which are parametric) with AspectJ pointcuts, and specify the property with a formalism over the declared events. Differently, in our formalism, we explicitly support concurrency properties by associating events with thread attributes and atomic regions, and allowing parallelism between events. To instantiate our design, discussed in more detail later, we implemented an initial specification formalism for properties written in the form of regular expressions.

We further develop a new and sound causal model executable by a computing device having a processor and computer-readable memory. The sound causal model is based on the local traces of each individual thread, rather than a global trace. This new model not only ensures that GPredict never reports any false positive (i.e., every property violation reported by GPredict is real), but also enables GPredict to be synchronization-free for collecting the execution traces at runtime, incurring much less runtime overhead than existing techniques. Discussed herein is how to extract the synchronization constraints (e.g., causal orderings caused by the signal wait/notify events) from the thread local traces and a formal constraint modeling used later prove soundness of GPredict.

We have implemented GPredict for Java programs and evaluated it on a set of real world applications with high-level generic properties, as well as conventional data races, atomicity violations, and deadlocks written in our specification language. We show GPredict is both expressive and effective in predicting generic property violations. Moreover, comparing to the state of art techniques that log a global trace, GPredict has significantly better runtime performance due to the use of thread-local traces, incurring 10%-82% less overhead on DaCapo benchmarks.

Generic Predictive Analysis

In generic predictive analysis ("PTA"), computations of a concurrent program may be scheduled in different orders, due to scheduling non-determinism, and that from one observed execution, a causal model can be constructed to infer a set of similar feasible executions, which can be used to predict behaviors not seen in the observed execution.

The disclosed system (executed as "GPredict") provides a general technique for the PTA of generic property violations based on constraint solving. In the disclosed system and technique, both the causal model and the property violations can be modeled uniformly by first-order logical constraints. By solving the constraints, the system may predict property violations in any and all of the feasible executions captured by the causal model. There are two categories of events in the disclosed model:

Property Events: Declared in the property specification.

Model events: Critical events that determine the causal model, e.g., all the reads and writes to shared data and thread synchronizations.

Overview

We first give an overview of GPredict using a simple example. We then discuss the challenges and explain how we address these challenges. In FIG. 8, there are two threads (T1 and T2) accessing a shared collection. T1 first initializes the collection with an item A, then it forks T2 and iterates over the collection. In T2, it first adds item B to the collection, then iterates over the collection. This program, although intuitive, may throw a ConcurrentModificationException because when T1 is iterating over the collection, T2 might simultaneously update the collection, which breaks the contract of Java Iterators. Suppose our problem here is to detect this error. A classic solution is through runtime verification, such as MOP, that allows the users to specify the safe iterator property using specification formalisms, and automatically generates monitors to detect violations of the property at runtime. However, since the error depends on the thread schedule to manifest, which is non-deterministic, conventional runtime monitoring approaches are unlikely to detect it.

From a high level view, GPredict addresses this problem by analyzing the causal ordering relation between events observed at runtime with a constraint model. We give each event (including both property events and model events) an order variable representing its order in the schedule of a possible feasible execution and use these order variables to formulate the property violation. For example, let $O_i$ denote the order of the event at line i. A violation of the safe iterator property can be formulated as $O_3<O_5<O_4$. Similarly, the causal ordering constraints between events can be modeled as $O_1<O_2<O_3<O_4 \wedge O_5<O_6<O_7$ (to respect the program order, e.g., $O_1<O_2$ means line 1 must happen before line 2) and $O_2<O_5$ (to respect the synchronization semantics, e.g., line 5 can only happen after line 2, because T2 is forked at line 2). Conjuncting all these constraints, GPredict invokes an SMT solver (e.g., Z3) to solve the combination of constraints. If the solver returns a solution, this means that there exists a schedule that violates the property. Moreover, such a schedule represents a witness to the property violation, and can be deterministically replayed to manifest the error. Back to our example, the solver may return $O_1=1$, $O_2=2$, $O_3=3$, $O_4=5$, $O_5=4$, $O_6=6$, $O_7=7$, which corresponds to the property violating schedule 1-2-3-5-4-6-7.

There are several significant challenges to overcome:
- Property specification. How to specify the properties? What type of formalisms can we support? How to specify conventional concurrency errors as well, such as races, atomicity violations, deadlocks, etc.?
- Property encoding. How to encode the generic properties with constraints? How to handle parametric properties? For example, both line 4 and line 7 in FIG. 8 access an iterator (but different instances) of the collection. If we formulate the constraint as $O_3<O_5<O_7$ instead of $O_3<O_5<O_4$, we would not be able to find the real property violation.
- Soundness (e.g., no false positive). How to guarantee that every property violation we detect is real? For example, if there exists certain causal order not modeled by our constraints, the detected property violation might be false.

In the rest of the section, we focus on discussing the first two issues. We present a formal constraint modeling of our sound causal model to address the third issue in a later section.

Generic Property Specification

GPredict allows specifying properties using regular expressions (RegExp). We choose RegExps as they are natural and convenient to reflect the ordering relation between property events. Nevertheless, our technique works with any formalism whose properties/formulae can be monitored using finite-state machine monitors (e.g., linear temporal logic).

FIG. 9 shows the syntax of our property specification language. It is an extension of the MOP specification, including the property declaration (name and parameters), a list of event definitions, and a formula specifying the property. The event syntax makes use of AspectJ, containing an identifier, an advice (with no body), and a pointcut. The property is then defined in terms of the event identifiers using RegExp.

FIG. 10 shows an example of the UnsafeIterator property in our specification. The property is parameterized by a collection and an iterator. There are three types of events defined in the specification: create (creating an iterator i of the collection c), update (adding or removing an item to/from the collection), next (iterating over the collection via calling next( ) on the iterator). The formula of the property violation pattern is written as create next*update+next, meaning that the property is violated if an update event can happen after create and before a next. Events in this pattern are parameterized by c and i as defined in the specification.

To explicitly support concurrency related properties, our specification differs from MOP in the property formula where, in GPredict, the event identifiers are also allowed to bind with thread attributes and begin/end of atomic regions, in the form of <Id>(<Thread>,<Begin>|<End>). The <Thread> attribute denotes a meta identification ("ID") of the thread performing the corresponding event, such that events bound with different <Thread> attributes are by different threads. The <Begin> and <End> attributes are written as "<"<AtomRegion> and ">"<AtomRegion>, denoting the begin and end of an atomic region identified by <AtomRegion>.

FIG. 12 is an example of the read-write-write atomicity violation written in our specification language that uses these attributes. The atomicity violation is concerned with three accesses to a shared variable s by two threads, which can be declared as read and write events using the get and set pointcuts. The begin and end events mark the beginning and ending of the execution of a method m, which is considered to be atomic. In the formula, to distinguish events by different threads, we bind each event with a thread attribute, e.g., read(t1) and write(t2). To match begin with end, these are written as begin(t1,<r1) and end(t1,>r1), ensuring that these two events are marking the same atomic region (denoted by a meta ID r1). The whole formula is then written as begin(t1,<r1) read(t1) write(t2) write(t1) end(t1,>r1), denoting that the violation occurs if the two read and write events inside an atomic region marked by the begin and end events of any thread t1, can be interleaved by a write event from a different thread t2.

FIG. 12 shows a simple program with such atomicity violations. Note that the specification of atomic regions in our language is general and can be specified by arbitrary events and the orders between them, which is much more expressive than conventional atomic regions that are limited to synchronization methods or blocks.

In addition, we introduce a new notation "||" in our specification language, which is used to denote the parallelism between events. For example, <Id1>||<Id2> means that the two events <Id1> and <Id2> can be executed in parallel, with no causal ordering between each other. This notation is useful for specifying a range of interesting properties, e.g., data races. FIG. 13 shows the specification of a read-write data race property on a shared variable s. The property is parametrized by the object instance of s to distinguish different memory locations. The read event is declared as a get pointcut, and the write event as set. The formula is then written as read(t1)∥write(t2), meaning that the two events by two different threads can happen in parallel.

Property Encoding

Recall in FIG. 9 that properties are written as RegExp patterns over the alphabet of the declared event identifiers. Because the events are defined with pointcuts, which can be triggered multiple times in the execution, each declared event may correspond to multiple event instances in the execution. We shall refer to such event instances as property events.

Consider the order of each event identifier in the RegExp patterns. For the pattern to be satisfied, there exists a corresponding ordered sequence of property events such that each event matches with the corresponding event identifier. In other words, the pattern actually specifies the ordering constraints between property events, which can be directly modeled by their corresponding order variables. To model the constraints specified in the pattern, however, we address the following questions:

1) Property events are to be parametric; how to handle the parametricity?

2) An event identifier may have multiple matching property events; how to encode the constraints for all events?

3) Our pattern allows the RegExp quantifiers ("?", "*", "+"), as well as negation "!", boolean logics "|" and "&", and grouping parentheses "( )", and supports the bindings of thread attributes, atomic regions, and the parallel notation "∥." How to handle all these features?

1) Parametricity: For parametric property events, we bind the property parameters to concrete object instances. Each binding corresponds to a different property instance, and we construct a separate constraint. Constraints of all property instances can then be combined together by disjunction ($\vee$). To create the bindings for each instance, we enumerate the set of object instances corresponding to each parameter associated with the property events. For each object instance, we create a separate binding to the corresponding parameter. By joining the bindings for all parameters in the property, we can create the bindings for all property instances. The total number of bindings is a multiplication of the number of object instances for each parameter. Back to our example in FIG. 8, there is only one binding to the Collection parameter, c, and two to the Iterator parameter, $i_1$ and $i_2$; hence, there are two bindings: (c, $i_1$) and (c, $i_2$).

2) Multiple Event Instances: For each event identifier in the pattern, since the existence of one such property event is sufficient to witness the property violation, if there are multiple events corresponding to an identifier, it seems intuitive to pick any one to build the constraint. However, this naive approach does not work, because the constraint with respect to the chosen event might not be satisfied, while there might exist other events that are not chosen that can manifest the property violation. In other words, this approach can miss predictable property violations. To address this issue, we should not miss any such property event. Hence, similar to parameter bindings, we enumerate the corresponding events per property instance that match with the event identifier in the pattern. For each property event, we create a separate ordering constraint and disjunct them. In this way, no property violation will be missed. Back to our example, for the property instance (c, $i_1$), there exist two update events, at lines 5 and 1, respectively, so we construct the disjunction $O_3<O_1<O_4 \vee O_3<O_5<O_4$. Although $O_3<O_1<O_4$ cannot be satisfied (because line 1 must happen before line 3), $O_3<O_5<O_4$ can, so the property violation can still be detected.

3) RegExp pattern constructs: Taking the RegExp pattern as input, we first preprocess the pattern to handle quantifiers ("*", "+", "?"). For "?," we replace it by "|ϵ," meaning that one or zero of its preceding event identifier may appear in the pattern. For "*" and "+," because both of them can denote an infinite number of events, to avoid exploding the constraints, we remove "*" and its associated event identifier or identifiers from the pattern (because "*" can denote zero event), and remove "+" from the pattern (because "+" can denote one event). For example, the UnsafeIterator pattern in FIG. 10 "create next*update+next" is processed to "create update next." This treatment, however, may result in missing certain violations. We expect this is acceptable since GPredict is used for predicting whether a property can be violated or not. The number of violations is less important. In fact, we may simply exclude "*" and "+" from the specification. We choose not to, so that existing MOP properties can be supported without any change.

In constructing the constraints, we handle "!", "|", "&", "∥", and "( )" as follows. For "!," we add a negation (e.g., a logical NOT) to the corresponding constraint. Note that "!" may conflict with our treatment to "*" and "+," which results in over-approximation when "!" and "*" (or "+") are used together in the pattern. To avoid this issue, we disallow such patterns in our specification. For "|" and "&," we take them as disjunction and conjunction, respectively, between the corresponding constraints. For "∥", we create an equality constraint between the order variables of the two events. For example, for the data race specification in FIG. 13, for any pair of such property events $e_i|e_j$, we add the equality constraint $O_i=O_j$. For "( )", there are two cases: parentheses that separate event identifiers, and parentheses for thread and atomic region attributes. For the former, as it defines the scope of its embraced event identifiers, we can skip it after constructing the constraints of its embraced event identifiers. For the latter, it is slightly more complicated, as we need to treat the thread attributes and atomic region attributes separately.

For thread attributes, similar to the treatment of parametric bindings, we first group the corresponding events by their thread ID, and then enumerate each group. During enumeration, the only condition is that events with different thread attributes are to be bound to different groups of events. For example, consider the example in FIG. 12 with the data race pattern "read(t1)∥write(t2)," we can bind both t1 and t2 to either T1 or T2, but they cannot be simultaneously bound to the same thread. The constraints of different groups are then combined together by disjunction.

For atomic region attributes, note that we match each <Begin> event with its corresponding <End> event; otherwise, it might lead to false alarms. Taking FIG. 12 as an example, suppose we change the method m to be synchronized, then there is no atomicity violation. However, since m is called twice by thread T1, there are two begin and two end events by T1. If the first begin is matched with the second end, then the ordering of events can still be satisfied when T2 calls m between the two calls of m by T1, which is not a real atomicity violation. Hence, to maintain a correct match, we preprocess the events with atomic region attributes. Because all such events are nested, we can use a stack to keep track of the current active atomic region, and match each <Begin> with the correct <End>. We assume the specified RegExp pattern is consistent, and currently we do not perform any static checking for it. Otherwise, if the pattern is inconsistent, no violation will be predicted.

Constraint Modeling

Our constraint modeling of the causal model extends our prior work (discussed earlier), with the main improvement that it is built upon the thread-local traces instead of a global trace.

We consider the following types of model events:
begin(t)/end(t): the first/last event of thread t;
read(t, x, v)/write(t, x, v): read/write a value v on a shared variable x;
lock(t, l)/unlock(t, l): acquire/release a lock l;
fork(t, t')/join(t, t'): fork a new thread t'/block until thread t' terminates;
wait(t, l, g): a composition of three consecutive events: unlock w(t, l)-wait(t, g)-lock w(t, l): first release lock l, then block until receiving signal g, finally acquire l;
notify(t, g)/notifyAll(t, g): send a signal g to wake up a waiting thread/all waiting threads.

From a high level view, taking the model events by each thread as input, we encode all the necessary ordering constraints between model events as a set of first-order logic formulae. The whole formula, $\Phi$, is a conjunction of three sub-formulae over the order variables of the model events:

$$\Phi = \Phi_{mhb} \wedge \Phi_{sync} \wedge \Phi_{rw}.$$

Must Happens-Before Constraints ($\Phi_{mhb}$)

The must happens-before (MHB) constraints capture the causal order between events that any execution of the program must obey. Let < denote the smallest transitively-closed relation over the events in the observed execution such that for any two events $e_i$ and $e_j$, $e_i < e_j$ holds if one of the following holds:

Program Order: $e_i$ and $e_j$ are by the same thread, and $e_i$ occurs before $e_j$.

Fork Order: $e_i$=fork(t, t') and $e_j$=begin(t').

Join Order: $e_i$=end(t) and $e_j$=join(t', t).

For each MHB relation $e_i < e_j$, we add a conjunction of the constraint $O_i < O_j$ to $\Phi_{mhb}$. The size of $\Phi_{mhb}$ is linear in the total number of model events.

Synchronization Constraints ($\Phi_{sync}$)

The synchronization constraints capture the locking and wait-notify semantics introduced by synchronization events: lock, unlock, wait, notify, and notifyAll. Recall the semantics that a wait(t, l, g) event can be split into three events: unlock w(t, l)-wait(t, g)-lock w(t, l). Hence, we divide each lock region by enclosing wait into two smaller lock regions. $\Phi_{sync}$ is constructed as a conjunction of two constraints: locking constraints and wait-notify/notifyAll constraints as follows.

Locking constraints ($\Phi_{lock}$). For each lock l, we first extract a set S of all the (lock, unlock) pairs on l (including unlock w and lock w from the wait events), following the program order locking semantics, e.g., an unlock event is paired with the most recent lock event on the same lock by the same thread. We then add the following constraint to $\Phi_{lock}$:

$$\bigwedge_{(a,b) \neq (a',b') \in S} (O_b < O_{a'} \vee O_{b'} < O_a)$$

The size of $\Phi_{lock}$ is quadratic in the number of lock regions.

Wait-notify/notifyAll constraints ($\Phi_{signal}$). The core challenge of constructing $\Phi_{signal}$ is to find, for each wait event, a matching notify or notifyAll event that can send the correct signal to wake it up. In previous predictive trace analysis work, this task is easy, because a global trace is available and each wait can be simply matched with the most recent notify or notifyAll event with the same signal. However, this problem becomes challenging when we have only the thread-local traces, where there is no causal ordering information between wait/notify/notifyAll events across different threads. For example, we cannot match a wait with an arbitrary notify, because the notify might happen after the wait, or it might have been matched with another wait.

We develop a sound constraint model that addresses this issue. The wait and notify/notifyAll events seem to always be executed inside a lock region. For a wait(t1, l, g) to match with a notify(t2, g), suppose the enclosing lock regions of wait(t1, l, g) and notify(t2, g) are marked by lock(t1, l)/unlock (t1, l) and lock(t2, l)/unlock(t2, l), respectively, it holds that the unlock w(t1, l) event happens before lock(t2, l). Otherwise, notify(t2, g) would happen before unlock w(t, l) and the signal would be lost. Meanwhile, all the other wait events are executed either before lock(t2, l) or after unlock w(t1, l). Otherwise, notify(t2, g) might be matched with more than one wait event.

Specifically, let X and Y denote the set of wait and notify events on the same signal. For each wait(t, l, g) event w, let $O_w^{ul}$, $O_w$, and $O_w^l$ denote the corresponding order variables of unlock w(t, l), wait(t, g) and lock w(t, l), respectively, and let $O_{l\_e}/O_{ul\_e}$ denote the order variables of the lock/unlock events of the enclosing lock region of a wait or notify event e. $\Phi_{signal}$ for w is written as follows:

$$\bigvee_{w \in X, n \in Y} \left( O_w^{ul} < O_{l\_n} \wedge O_n < O_w \wedge \bigwedge_{w \neq w' \in X} (O_{ul\_w} < O_{w'}^l \vee O_{ul\_w'} < O_{l\_n}) \right)$$

The constraint model for wait-notifyAll is similar, except that the conjunction over the other wait events in X is not needed, because a notifyAll event can be matched with multiple wait events. The total size of $\Phi_{signal}$ is $2|X|^2|Y|$, which is cubic in the number of wait/notify/notifyAll events.

Read-Write Constraints ($\Phi_{rw}$)

The read-write constraints ensure the data-validity of events: a read must read the same value as that in the observed execution, though it may be written by a different write. Specifically, for each property event p, we add a constraint $\Phi_{rw}(p)$ to $\Phi_{rw}$. $\Phi_{rw}(p)$ is constructed over a set, R, containing all the read events that must happen-before (<) it. For each read(t, x, v) in R, let W denote the set of write(_, x,_) events in the trace (here '_' means any value), and $W_v$ the set of write(_, x, v) events. $\Phi_{rw}(p)$ is written as:

$$\bigwedge_{\forall w \in W_v} \Phi_{rw}(w) \wedge O_w < O_r \wedge \bigwedge_{\forall w' \in W} O_{w'} < O_w \vee O_{w'} > O_r$$

The constraints above state that the read event, r, may read the value v on x written by any write event, w=write(_, x, v), in $W_v$ (which is a disjunction), with the constraint that the order of w is smaller than the order of r, and there is no other write(_, x,_) event that is between them. Moreover, this write(_, x, v) event itself is feasible, so we add a conjunction of the constraint $\Phi_{rw}(w)$.

The size of $\Phi_{rw}$ is cubic in the number of read and write events. Nevertheless, in practice, $\Phi_{rw}$ can be significantly reduced by considering the MHB relation <. For example, consider two write events w1 and w2 in $W_v$. If w1<w2<r, we can exclude w1 from $W_v$ because r cannot read the value written by w1 due to $\Phi_{mhb}$. Similarly, for any w'∈W, if r<w', then w' can be excluded from W Soundness The next theorem states that our constraint modeling based on the thread-local traces is sound:

Proof. It is clear that $\Phi_{mhb}$ and $\Phi_{rw}$ capture the data and control dependencies for every event in the trace. The only less obvious part is the thread synchronization constraints captured by $\Phi_{sync}$. Let's use an example in FIG. 14 to show the soundness of $\Phi_{sync}$. For simplicity, we use the label left to each event to refer to both the event and its order variable. In the example program, both threads T1 and 72 perform a wait within a lock region (x1/x5 and y1/y5 respectively) on lock l, and T3 performs a notify (z2) within a lock region (z1/z3) on the same lock. Following the semantics of wait, the wait events of T1 and T2 are split into six events (denoted by x2-x3-x4 and y2-y3-y4, respectively). Hence, there are five lock/unlock pairs in the trace. Our locking constraints (FIG. 14) have a constraint for every two lock/unlock pairs by different threads enforcing that they cannot overlap. Clearly, mutual exclusion is ensured. For wait-notify, note that there is only one notify event but two wait events, either the wait event of T1 or of T2 can be matched with the notify event, but not both. Following our construction of $\Phi_{signal}$, our constraints for the two wait events are written as $x2<z1 \wedge z2<x3 \wedge (x5<y4 \vee y5<z1)$ and $y2<z1 \wedge z2<y3 \wedge (y5<x4 \vee x5<z1)$. By analyzing the conjunction of these two constraints, we can see that it contradicts with the locking constraints. Hence, $\Phi_{signal}$ cannot be satisfied, which ensures the semantics that a notify cannot be matched with more than one wait event.

Implementation of GPredict

We have implemented GPredict for Java programs based on JavaMOP and Soot. FIG. 15 shows a system 100 including an example of the GPredict system infrastructure. The system may include an instrumentor 102, a JavaMOP component 104, a trace collector 108, a constraint builder 112 and an SMT solver 116. Additional or fewer components may be envisioned in alternative embodiments.

Taking the target program (Java byte-code) and the property specification as input, the instrumentor 102 first adds necessary instrumentation into the program for logging the model events during execution, and uses JavaMOP's 104 front-end parser to produce a corresponding AspectJ file for the property. During program execution, the AspectJ file may be weaved into the instrumented program to emit the property events. The trace collector 108 may log and group events by their thread ID, and save the logged events into a database together with a property pattern. Then taking the logged information, an offline analyzer of the system 100 may use the constraint builder 112 to construct the constraints related to ordering of the logged events. The system 100 may then invoke the SMT solver 116 to solve the constraint problem, which will result in reporting violations when a solution is found for a logical group of constraints that encodes a trace property whose violation corresponds to a concurrency bug.

Instrumentation: This phase consists of two parts. The first part takes in the target program, where the instrumentor 102 may perform the instrumentation on Jimple, an intermediate representation of Java bytecode in the three-address form. The instrumented events may include read and write accesses to shared data such as instance fields and class variables, entry and exit to monitors and synchronized methods, wait and notify/notifyAll method calls, and thread fork and join. The second part includes parsing the property specification. Since our specification language is adapted from MOP, the system makes use of the JavaMOP parser to produce an AspectJ file with each declared event converted into a corresponding pointcut. The aspects may then be weaved into the instrumented program dynamically to emit both the model events and property events at runtime.

Trace Collection: For each model event, the trace collector 108 log the runtime data as described previously, such as the thread ID, the memory address, the read or write value, etc. The logging of property events is slightly different. Recall that for parametric properties, the system needs to group events into different property instances according to the runtime object of the event. Instead of performing this grouping task offline, we do it online by reusing the monitoring mechanism of JavaMOP 104. Specifically, JavaMOP internally creates a separate monitor for each property instance, and matches each event to the related monitors. Hence, the system 100 inserts a logging method call in each monitor function and saves the property event associated with the monitor ID (which is equivalent to the property instance) into a database. During constraint construction by the constraint builder 112, the system can use the monitor ID to identify each property instance without grouping the events again.

In order to reduce the runtime overhead, remember that the system 100 does not collect a global trace but the events for each thread separately. The system maintains for each thread a thread-local buffer for storing the events performed by the system's execution of respective threads of the program. Once a thread creates a new event, the trace collector 108 adds that event to the thread's local buffer. At the end of the logging phase, the system 100 saves the events into the database indexed by the thread ID.

Constraint Construction and Solving: The constraint construction follows the property coding for property constraints and the constraint modeling for model constraints. Note that the disclosed constraint model is very extensible. It is not limited to a single property, but multiple properties can be encoded simultaneously. For example, the UnsafeIterator property can be encoded together with the data race patterns by a disjunction. For solving the constraint, we can use Z3 in our implementation and set the timeout to five minutes. Note that almost all of our constraints can be ordering constraints (e.g., comparing two integer variables by "<"), which can be efficiently solved by the Integer Difference Logic (IDL). The only exception is the equality constraints (e.g., $O_i=O_j$) encoded for "||" in the property specification. For such constraints, the system can filter them out by replacing all occurrences of $O_i$ in the constraints by $O_j$.

Evaluation of GPredict

We have evaluated the system 100 (GPredict) on a set of real concurrent programs with both generic properties and conventional concurrency errors written in our specification language. Moreover, to assess the improved runtime performance of the system over previous techniques by using thread-local traces, we have run GPredict with a set of DaCapo benchmarks and compared its performance with the approach of logging global traces. This section presents our results. All experiments were conducted on an 8-core 3.50 GHz Intel i7 Linux computer.

Effectiveness

We have applied GPredict to six programs: Derby, H2, JFreeChart, Jigsaw, and two JDK libraries and examined properties including UnsafeIterator, NullPointer Dereference, UnsafeDatabaseAccess, Check-Then-Act, as well as data races, atomicity violations, and deadlocks. The results, shown the table of FIG. 18, demonstrate that GPredict is effective in expressing properties and predicting violations.

1) UnsafeIterator: FIG. 16 shows a real bug violating the UnsafeIterator property (as explained previously) in JFreeChart. When the two methods addChangeListener and fireSeriesChanged are called concurrently by different threads, a ConcurrentModificationException may be thrown. The reason is that in fireSeriesChanged an arraylist of listeners are iterated to notify the SeriesChangedEvent, while new listeners can be added to the arraylist from addChangeListener concurrently. This error is common in concurrent programs, as the error is neither a data race nor an atomicity violation, and cannot be detected by conventional race or atomicity violation detectors.

With GPredict, the system 100 may specify the UnsafeIterator property (as shown in FIG. 10) and predict violations. Based on a normal run of the test driver provided in the bug repository, GPredict captured 90 property events and 140 model events and predicted 20 violations within a second. We manually inspected all these violations and empirically confirmed that these 20 violations were all real. Note that each violation is unique with respect to the event sequences defined in the property. We did not further prune redundant violations with the same event signature.

2) Null-Pointer Dereferences: Null-pointer dereference errors are common in multithreaded programs. Though they are not unique to concurrency, they are much harder to detect in multithreaded programs. FIG. 17 shows the concurrency bug #2861 in Apache Derby. This bug is concerned with a thread safety issue in the TableDescriptor class. The shared data referencedColumnMap is checked for null at the beginning of the getObjectName method and later dereferenced if it is not null. Due to an erroneous interleaving, another thread can set referencedColumnMap to null in the setObjectName method and causes the program to crash by throwing a NullPointerException.

This bug is in fact an atomicity violation, but it can be specified more intuitively as a null-pointer dereference. Users need only to declare two events, deRef and setNull, on the variable referencedColumnMap, and specify the pattern as deRej(t1)||setNull(t2), meaning that the two events are from different threads and can be run in parallel. Because deRef is declared as an event on dereferencing referencedColumnMap, and setNull an event setting referencedColumnMap to null on the same TableDescriptor object (represented by the property parameter o), a null-pointer dereference happens if the pattern is satisfied. We ran GPredict on Derby with this property. GPredict collected a trace with around 12K model events and 27 property events, and found 5 violations in 5 s.

Note that although our specification in this example (bottom of FIG. 17) only concerns the field referencedColumnMap, it could be written for any generic object and any reference field. If the user wants to detect all null-pointer dereferences, she can simply replace the parameter of the get/set pointcuts with a wild card "*". In that case, our algorithm will enumerate all fields.

3) UnsafeDatabaseAccess: Database applications typically follow some safe patterns to access data. For example, an authenticated connection may first be established before any other operation, a table may be created before any update or query accesses on the table, and all operations may finish before closing the database connection, etc. There is likely a bug if the application violates such patterns. FIG. 19 shows the specification of an UnsafeDatabaseAccess property, which defines five property events (open connection, create table, etc) over two parameters (the connection and the table name). The pattern "!" (open create update delete close) specifies that the property is violated when these events happen in an order different from the written one. The negation symbol "!" is interpreted as a logical NOT in the property constraints.

The UnsafeDatabaseAccess property cannot be handled by existing techniques such as serializability violation detectors (even with event abstraction) or typestate-based detectors, because any violation instance of this property contains events over multiple objects. In our experiment, we wrote a simple multithreaded client program for testing the H2 database server with GPredict. GPredict found 16 violations in less than a second based on a trace with 112 model events and 14 property events. (As H2 was run in the server model, we did not log its model events.)

4) Check-Then-Act: Collections are frequently used following the Check-Then-Act idiom: the code first checks a condition, and then acts based on the result of the condition. However, in concurrent programs, misuse of this idiom can lead to bugs. FIG. 20 shows another bug in Derby. The method removeStatement first checks if the statementCache contains a statement, and if yes, then removes the statement by calling the method remove. To support concurrent accesses, the data structure for maintaining the statementCache is implemented as a ConcurrentHashMap. However, due to some bad interleaving, more than one thread might still execute the remove method concurrently, causing an assertion failure eventually.

FIG. 20 (bottom) shows the Check-Then-Act property in our specification language. In the pattern, the check event and the second act event are bound to thread t1, and the first act event to t2. The pattern means that a violation happens if two check and act events consecutive in a certain thread can bracket another act event from a different thread. GPredict collected a trace of 20K model events and 1.3K property events, and found 4 violations in around 8 s.

5) Races, atomicity violations, and deadlocks: Our technique also works seamlessly for predicting conventional errors such as data races, atomicity violations, and deadlocks, without doing anything specific for them. Moreover, these errors can be specified more intuitively with our specification language by high level events than previous techniques that rely on checking low level shared data accesses. We have also applied GPredict to predict data races in Jigsaw and a deadlock bug in JDK logging package.

Runtime Performance

To understand the performance improvement of our technique, e.g., enabling the use of thread-local traces instead of a global trace, we quantify GPredict using a set of widely used third-party concurrency benchmarks from DaCapo (shown in the table of FIG. 21). All these benchmarks are real world applications containing intensive shared data accesses and synchronizations by concurrent threads. Previous PTA techniques can incur significant runtime slowdown on these benchmarks because logging a global trace requires synchronizing every model event with a global lock protecting the logging data structure. However, logging thread-local traces allows the recording computation by different threads to be done in parallel, which is much cheaper as no extra synchronization is required.

To perform an unbiased comparison, we also implemented in GPredict the ability of logging global traces, to ensure the same events are logged at runtime. In our experiment, we configure GPredict to run each benchmark with three different modes for logging the model events: no logging, logging per-thread traces, and logging a global trace. FIG. 21 shows the results. All data were averaged over 5 runs. Compared with logging a global trace, recording the thread-local traces incurs significantly less runtime overhead with respect to the base execution. On average, GPredict reduces the runtime overhead by 54% for the evaluated benchmarks, ranging between 10% and 82%. Compared to xalan, GPredict is even more than four times faster. Although the overhead of GPredict is still large (because there is a myriad of model events to log in these benchmarks), compared to previous techniques that require logging a global trace, GPredict significantly improves the runtime performance of predictive trace analysis. To further reduce the overhead, we can use static analysis techniques to eliminate redundant events during instrumentation.

Figure 22:
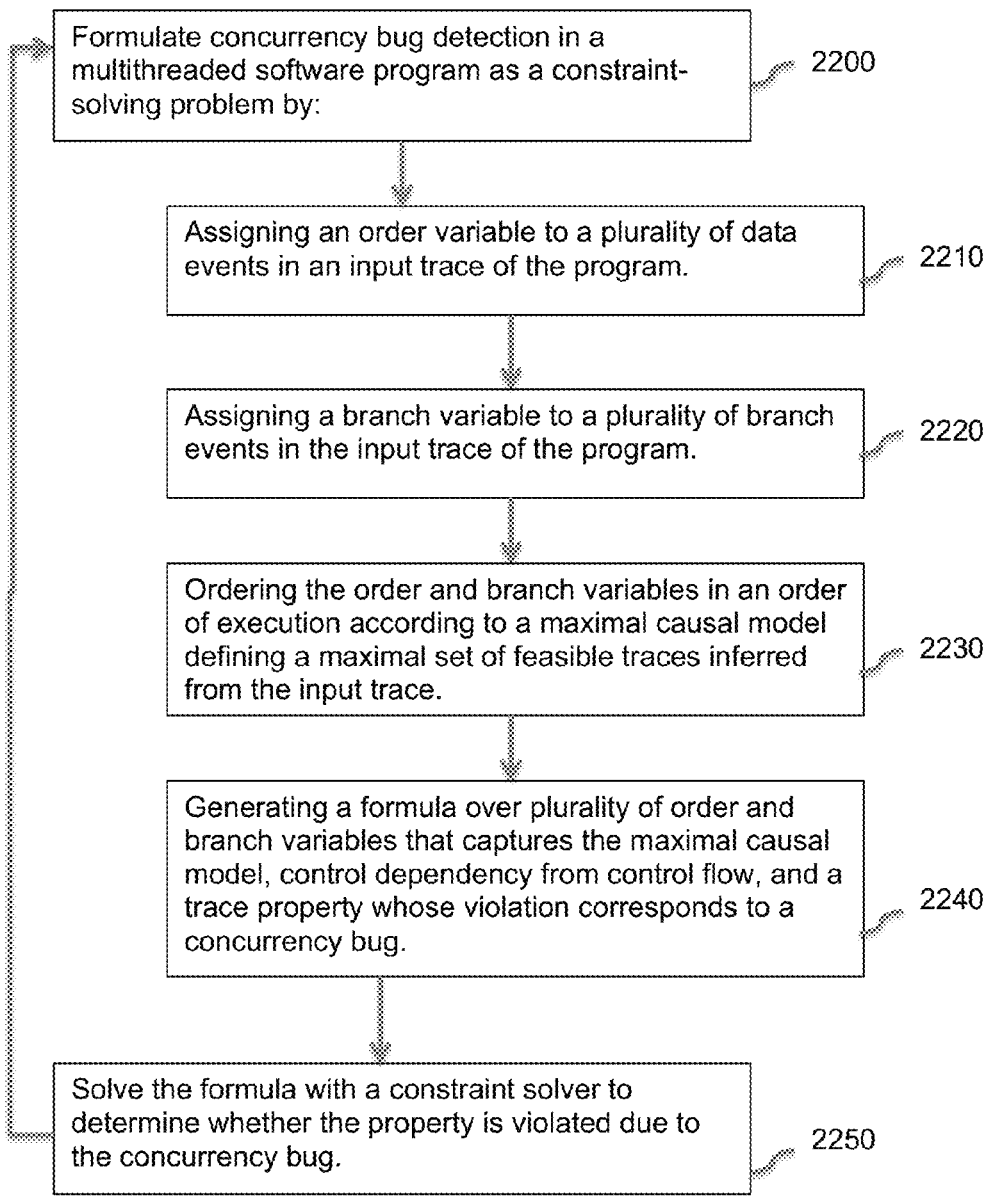
FIG. 22 is a flow chart of a method for detecting or predicting a concurrency bug of a multithreaded software program.

FIG. 22 is a flow chart of a method for detecting or predicting a concurrency bug of a multithreaded software program ("program"). The method may begin with formulating, using at least one processor, detection of a concurrency bug of a multithreaded software program ("program") as a constraint-solving problem (2200) by: assigning an order variable to each of a plurality of data events in an input trace of the program as concurrency constraints (2210); assigning a branch variable to each of a plurality of branch events of the input trace of the program as control flow constraints (2220); ordering the order and branch variables in an order of execution according to a maximal causal model defining a maximal set of feasible traces inferred from the input trace executable by the program (2230); and generating a formula over the plurality of order and branch variables that captures the maximal causal model, control dependency from the control flow, and a trace property whose violation corresponds to the concurrency bug (2240). The method may further include solving, using the at least one processor, the formula with a constraint solver to determine whether the property is violated due to the concurrency bug (2250). The method of FIG. 22 can be repeated for additional concurrency bugs or the formula generated in step 2240 may be formulated so as to detect multiple concurrency bugs upon solving the formula.

Figure 23:
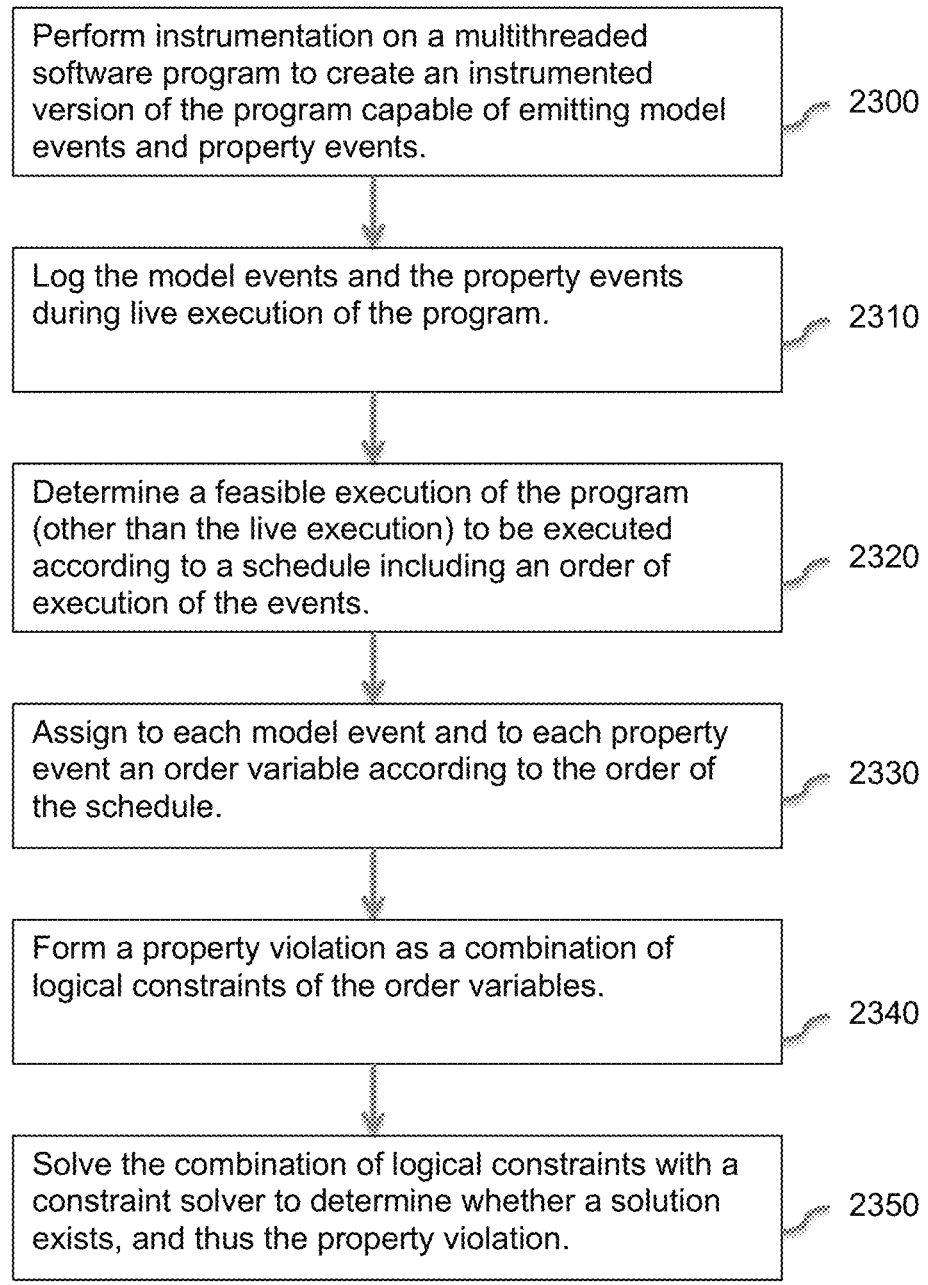
FIG. 23 is a flow chart of a method for predicting concurrency bugs corresponding to violation of generic (or high-level) properties of a multithreaded software program.

FIG. 23 is a flow chart of a method for predicting concurrency bugs corresponding to violation of generic (or high-level) properties of a multithreaded software program ("program"). The method may perform instrumentation on a multithreaded software program ("program") (2300), to create an instrumented version of the program capable of emitting model events and property events, wherein the model events include reads/writes to shared data and thread synchronizations, and the property events relate to high-level generic properties.

The method may further log the model events and the property events ("events") during live execution of the program (2310). The method may further determine a feasible execution of the program other than the live execution, the feasible execution to be executed according to a schedule including an order of execution of the events (2320). The method may further assign to each model event and to each property event an order variable according to the order of the schedule (2330). The method may then form a property violation as a combination of logical constraints of the order variables (2340). The method may further solve the combination of logical constraints with a constraint solver to determine whether a solution exists, thereby confirming whether the property violation exists for the feasible execution (2350).

Figure 24:
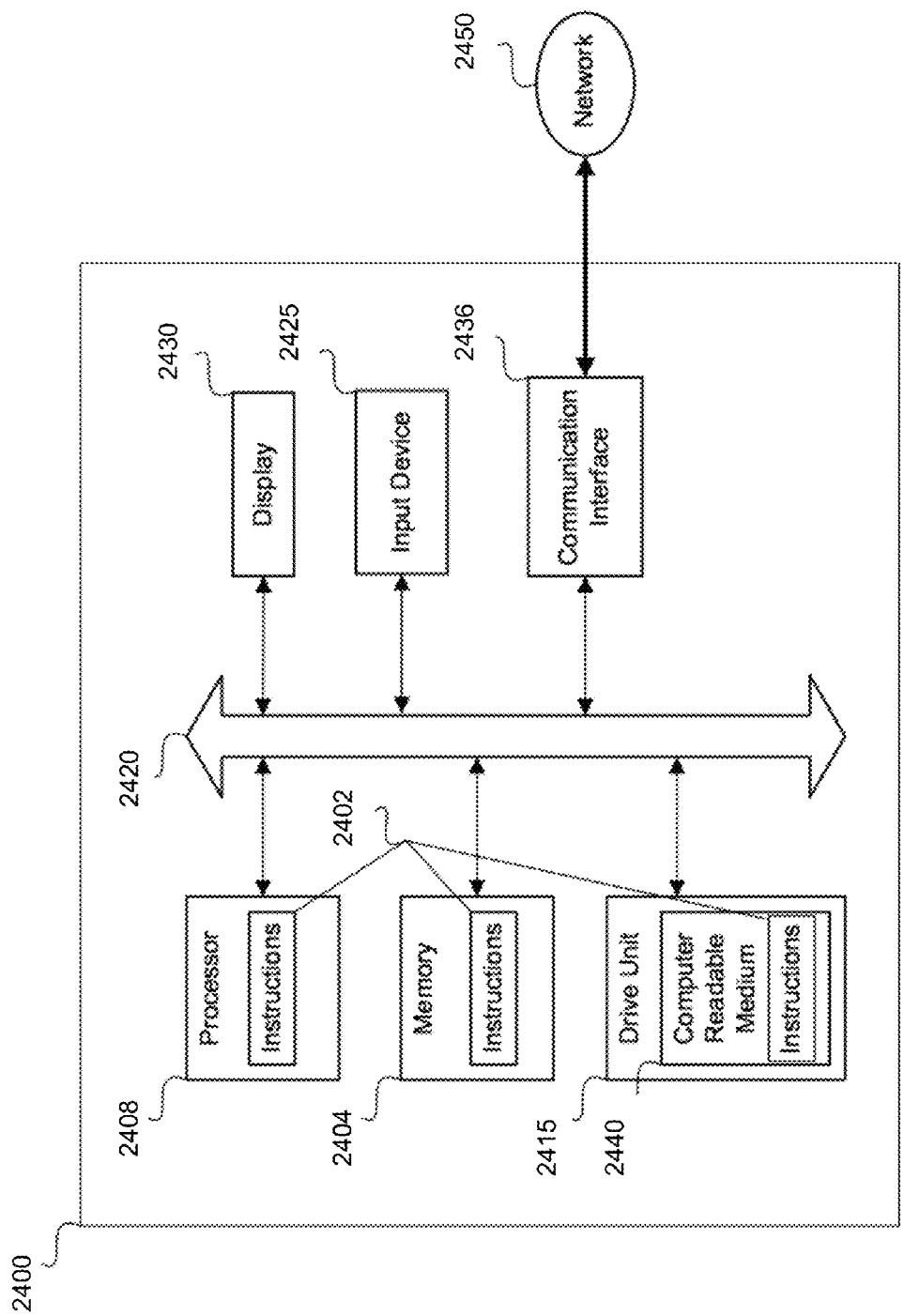
FIG. 24 illustrates a general computer system, which may represent any of the computing devices referenced herein.

FIG. 24 illustrates a general computer system 2400, which may represent the system 100 disclosed with reference to FIG. 15, or any other computing devices referenced herein for execution of the disclosed methods and algorithms. The computer system 2400 may include an ordered listing of a set of instructions 2402 that may be executed to cause the computer system 2400 to perform any one or more of the methods or computer-based functions disclosed herein. The computer system 2400 may operate as a stand-alone device or may be connected to other computer systems or peripheral devices, e.g., by using a network 2450.

In a networked deployment, the computer system 2400 may operate in the capacity of a server or as a client-user computer in a server-client user network environment, or as a peer computer system in a peer-to-peer (or distributed) network environment. The computer system 2400 may also be implemented as or incorporated into various devices, such as a personal computer or a mobile computing device capable of executing a set of instructions 2402 that specify actions to be taken by that machine, including and not limited to, accessing the internet or web through any form of browser. Further, each of the systems described may include any collection of sub-systems that individually or jointly execute a set, or multiple sets, of instructions to perform one or more computer functions.

The computer system 2400 may include a memory 2404 on a bus 2420 for communicating information. Code operable to cause the computer system to perform any of the acts or operations described herein may be stored in the memory 2404. The memory 2404 may be a random-access memory, read-only memory, programmable memory, hard disk drive or any other type of volatile or non-volatile memory or storage device.

The computer system 2400 may include a processor 2408, such as a central processing unit (CPU) and/or a graphics processing unit (GPU). The processor 2408 may include one or more general processors, digital signal processors, application specific integrated circuits, field programmable gate arrays, digital circuits, optical circuits, analog circuits, combinations thereof, or other now known or later-developed devices for analyzing and processing data. The processor 2408 may implement the set of instructions 2402 or other software program, such as manually-programmed or computer-generated code for implementing logical functions. The logical function or any system element described may, among other functions, process and/or convert an analog data source such as an analog electrical, audio, or video signal, or a combination thereof, to a digital data source for audio-visual purposes or other digital processing purposes such as for compatibility for computer processing.

The computer system 2400 may also include a disk or optical drive unit 2415. The disk drive unit 2415 may include a computer-readable medium 2440 in which one or more sets of instructions 2402, e.g., software, can be embedded. Further, the instructions 2402 may perform one or more of the operations as described herein. The instructions 2402 may reside completely, or at least partially, within the memory 2404 and/or within the processor 2408 during execution by the computer system 2400. Accordingly, databases configured to store data generated from execution of the disclosed methods and algorithms may be stored in the memory 2404 and/or the disk unit 2415.

The memory 2404 and the processor 2408 also may include computer-readable media as discussed above. A "computer-readable medium," "computer-readable storage medium," "machine readable medium," "propagated-signal medium," and/or "signal-bearing medium" may include any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 2400 may include an input device 2425, such as a keyboard or mouse, configured for a user to interact with any of the components of system 2400. It may further include a display 2430, such as a liquid crystal display (LCD), a cathode ray tube (CRT), or any other display suitable for conveying information. The display 2430 may act as an interface for the user to see the functioning of the processor 2408, or specifically as an interface with the software stored in the memory 2404 or the drive unit 2415.

The computer system 2400 may include a communication interface 2436 that enables communications via the communications network 2450. The network 2450 may include wired networks, wireless networks, or combinations thereof. The communication interface 2436 network may enable communications via any number of communication standards, such as 802.11, 802.17, 802.20, WiMax, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein. Such a programmed computer may be considered a special-purpose computer.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present embodiments are to be determined by the broadest permissible interpretation of the following claims and their equivalents, and shall not be restricted or limited by the foregoing detailed description. While various embodiments have been described, it will be apparent to those of ordinary skill in the art that many more embodiments and implementations are possible within the scope of the above detailed description. Accordingly, the embodiments are not to be restricted except in light of the attached claims and their equivalents.

The invention claimed is:
1. A system comprising:
a hardware processor;
a constraint solver executable by the hardware processor;
non-transitory computer-readable medium storing instructions executable by the hardware processor to maximize detection of concurrency bugs in different threads of a multithreaded software program ("program"), the instructions and the program executable by the hardware processor to:
formulate detection as a constraint-solving problem by:
assigning an order variable to each of a plurality of events in an input trace of the program;
ordering the order variables to corresponding events in an order of execution according to a maximal causal model, which captures a set of feasible traces that can be generated by a thread of a multithreaded program capable of generating the input trace and by a second input trace, wherein the input trace and the second input trace are thread-local traces;
defining the maximal causal model with multiple axioms comprising prefix closedness and local determinism, wherein prefix closedness is that prefixes of a feasible trace are also feasible, and local determinism is that threads of the program behave deterministically;
further defining local determinism to include:
data-abstract equivalence of the input trace and the second input trace of the program, where the input trace and the second input trace are equal except for data values in read events and write events of the plurality of events; and
a branch axiom, in relation to a first branch event of the plurality of events and using the data-abstract equivalence, comprising when read events in the input trace for the thread equal the read events in the second input trace for the thread, the first branch event in the second input trace is feasible; and
generating a formula over the order variables and over a plurality of branch variables corresponding to branch events, including the first branch event, that captures the maximal causal model, control flow, and a trace property whose violation corresponds to a concurrency bug; and
solve the formula with the constraint solver to determine whether the trace property is violated due to the concurrency bug, wherein employment of thread-local traces enables concurrency bug detection in multiple of the different threads in parallel, reducing runtime computation overhead of the hardware processor by at least ten percent.

2. The system of claim 1, wherein the instructions are further executable by the hardware processor to:
order the order and branch variables in an order of execution according to the maximal causal model; and
repeat the generating the formula for a plurality of trace properties, thus enabling the constraint solver to detect multiple concurrency bugs.

3. The system of claim 1, wherein the concurrency bug comprises a data race, and wherein the trace property comprises a conflicting operation pair of events from different threads being executed in succession.

4. The system of claim 3, wherein the formula encodes all feasible traces corresponding to each respective of a plurality of data races.

5. The system of claim 4, wherein the instructions, when executed by the hardware processor to generate the formula, further: generate a conjunction of sub-formulae over the order variables, the sub-formulae selected from at least one of: (i) must happen-before (MHB) constraints, (ii) lock mutual exclusion constraint, or (iii) race constraints.

6. The system of claim 5, wherein the MHB constraints include: (i) a begin event, which can happen only as a first event in a first thread and only after the thread is forked by a second thread; and (ii) an end event, which can happen only after an end event of a joined thread of the first and second threads.

7. The system of claim 5, wherein the lock mutual exclusion constraint requires that two sequences of events protected by an identified lock do not interleave, the sequences of events comprising acquire and release events.

8. The system of claim 5, wherein the race constraints comprise: (i) that each conflicting operation pair of events are executed in succession; and (ii) a conjunction of two control flow constraints specifying data-abstract feasibility of the conflicting operation pair of events, wherein the data-abstract feasibility ensures each read event that must happen before any of the conflicting operation pairs of events satisfies a data-consistency constraint comprising that each read retrieves an identical value as the respective read retrieves within the input trace.

9. A method comprising:
formulating, using a hardware processor of at least one computing device having non-transitory computer-readable medium for storing data and instructions, detection of a concurrency bug within different threads of a multithreaded software program ("program") as a constraint-solving problem by:
assigning an order variable to each of a plurality of data events in an input trace of the program as concurrency constraints;
assigning a branch variable to each of a plurality of branch events of the input trace of the program as control flow constraints;
ordering the order variables and the branch variables in an order of execution according to a maximal causal model defining a maximal set of feasible traces inferred from the input trace and from a second input trace, which are executable by the program, wherein the input trace and the second input trace are thread-local traces;
defining the maximal causal model with multiple axioms comprising prefix closedness and local determinism, wherein prefix closedness is that prefixes of a feasible trace are also feasible, and local determinism is that threads of the program behave deterministically;
further defining local determinism to include:
data-abstract equivalence of the input trace and the second input trace of the program, where the input trace and the second input trace are equal except for data values in read events and write events of the plurality of events; and
a branch axiom, in relation to a first branch event of the plurality of events and using the data-abstract equivalence, comprising when read events in the input trace for the thread equal the read events in the second input trace for the thread, the first branch event in the second input trace is feasible; and
generating a formula over the order and branch variables that captures the maximal causal model, control dependency from the control flow, and a trace property whose violation corresponds to the concurrency bug, and solving, using the hardware processor, the formula with a constraint solver to determine whether the trace property is violated due to the concurrency bug, wherein employment of thread-local traces enables concurrency bug detection in multiple of the different threads in parallel, reducing runtime computation overhead of the hardware processor by at least ten percent.

10. The method of claim 9, wherein the branch events occur between the data events within the feasible traces through the program.

11. The method of claim 9, wherein the maximal causal model incorporates a sequential consistency memory model, and wherein the formula encodes the concurrency and branch constraints as a set of first-order logical constraints.

12. The method of claim 9, wherein the concurrency bug comprises a data race, and wherein the trace property comprises a conflicting operation pair of events being executed in succession, without intervening events.

13. The method of claim 12, wherein assigning the order variables comprises assigning the order variables to only data events that stem from branch events leading to race-related operations.

14. A non-transitory computer-readable storage medium storing instructions thereon that, when executed by a hardware processor, cause a computer system to perform a plurality of operations comprising:
formulating detection of a concurrency bug of different threads of a multithreaded software program ("program") as a constraint-solving problem by:
assigning an order variable to each of a plurality of data events in an input trace of the program, as executed on the hardware processor, as concurrency constraints;
assigning a branch variable to each of a plurality of branch events of the input trace of the program as control flow constraints;
ordering the order variables in an order of execution according to a maximal causal model, which captures a set of feasible traces that can be generated by a thread of a multithreaded program capable of generating the input trace and by a second input trace, wherein the input trace and the second input trace are thread-local traces;
defining the maximal causal model with multiple axioms comprising prefix closedness and local determinism, wherein prefix closedness is that prefixes of a feasible trace are also feasible, and local determinism is that threads of the program behave deterministically;
further defining local determinism to include:
data-abstract equivalence of the input trace and the second input trace of the program, where the input trace and the second input trace are equal except for data values in read events and write events of the plurality of events; and
a branch axiom, in relation to a first branch event of the plurality of events and using the data-abstract equivalence, comprising when read events in the input trace for the thread equal the read events in the second input trace for the thread, the first branch event in the second input trace is feasible; and
generating a formula over the order and branch variables that captures the maximal causal model, control dependency from the control flow, and a trace property whose violation corresponds to the concurrency bug; and solving, using the hardware processor, the formula with a constraint solver to determine whether the property is violated due to the concurrency bug, wherein employment of thread-local traces enables concurrency bug detection in multiple of the different threads in parallel, reducing runtime computation overhead of the hardware processor by at least ten percent.

15. The non-transitory computer-readable storage medium of claim 14, wherein the plurality of operations further comprises:
ordering the order and branch variables in an order of execution according to the maximal causal model; and
repeating the generating the formula for a plurality of trace properties, thus enabling the constraint solver to detect multiple concurrency bugs.

16. The non-transitory computer-readable storage medium of claim 14, wherein the concurrency bug comprises a data race, and wherein the trace property comprises a conflicting operation pair of events from different threads being executed in succession.

17. The non-transitory computer-readable storage medium of claim 16, wherein the formula encodes all feasible traces corresponding to each respective of a plurality of data races.

18. The non-transitory computer-readable storage medium of claim 17, wherein the plurality of operations further comprises generating a conjunction of sub-formulae over the order variables, the sub-formulae selected from at least one of: (i) must happen-before (MHB) constraints, (ii) lock mutual exclusion constraint, or (iii) race constraints.

19. The non-transitory computer-readable storage medium of claim 18, wherein the MHB constraints include: (i) a begin event, which can happen only as a first event in a first thread and only after the thread is forked by a second thread; and (ii) an end event, which can happen only after an end event of a joined thread of the first and second threads.

20. The non-transitory computer-readable storage medium of claim 18, wherein the lock mutual exclusion constraint requires that two sequences of events protected by an identified lock do not interleave, the sequences of events comprising acquire and release events.

21. The non-transitory computer-readable storage medium of claim 18, wherein the race constraints comprise: (i) that each conflicting operation pair of events are executed in succession; and (ii) a conjunction of two control flow constraints specifying data-abstract feasibility of the conflicting operation pair of events, wherein the data-abstract feasibility ensures each read event that must happen before any of the conflicting operation pairs of events satisfies a data-consistency constraint comprising that each read retrieves an identical value as the respective read retrieves within the input trace.

* * * * *